United States Patent
Nakano et al.

(10) Patent No.: US 7,730,713 B2
(45) Date of Patent: Jun. 8, 2010

(54) GAS TURBINE POWER PLANT

(75) Inventors: Susumu Nakano, Hitachi (JP); Satoshi Dodo, Mito (JP); Kuniyoshi Tsubouchi, Mito (JP); Manabu Yagi, Tsuchiura (JP); Itsurou Sawada, Atsugi (JP); Tomoaki Inoue, Mito (JP); Makoto Hemmi, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 1325 days.

(21) Appl. No.: 10/897,002

(22) Filed: Jul. 23, 2004

(65) Prior Publication Data

US 2005/0039433 A1 Feb. 24, 2005

(30) Foreign Application Priority Data

Jul. 24, 2003 (JP) .............................. 2003-200965

(51) Int. Cl.
*F02C 7/12* (2006.01)
*F02C 6/00* (2006.01)
*H02K 9/00* (2006.01)

(52) U.S. Cl. ........................... 60/39.83; 60/802; 310/52

(58) Field of Classification Search ............... 60/39.53, 60/39.83, 775, 802; 290/1; 310/52, 58, 54, 310/55, 90, 57

See application file for complete search history.

(56) References Cited

U.S. PATENT DOCUMENTS

| | | | | |
|---|---|---|---|---|
| 3,234,735 A * | 2/1966 | Sage et al. | ................ | 60/39.181 |
| 3,774,971 A * | 11/1973 | Shimizu et al. | ................ | 406/93 |
| 4,044,561 A * | 8/1977 | Hohn | .......................... | 60/657 |
| 4,766,557 A * | 8/1988 | Twerdochlib | ................ | 702/51 |
| 4,927,336 A | 5/1990 | Rossmann et al. | | |
| 4,968,231 A * | 11/1990 | Zimmern et al. | ................ | 418/1 |
| 6,216,443 B1 * | 4/2001 | Utamura | ..................... | 60/39.53 |
| 6,240,730 B1 * | 6/2001 | Thiele | ........................... | 60/646 |
| 6,412,291 B1 * | 7/2002 | Erickson | ......................... | 62/87 |
| 6,718,750 B2 * | 4/2004 | Shibata et al. | ........... | 60/39.511 |
| 6,750,572 B2 * | 6/2004 | Tornquist et al. | ............... | 310/54 |
| 6,882,068 B2 * | 4/2005 | Weeber et al. | ................. | 310/59 |
| 6,918,253 B2 * | 7/2005 | Fassbender | .................. | 60/649 |
| 2002/0051592 A1 * | 5/2002 | Ferguson | .................... | 384/307 |
| 2002/0081235 A1 * | 6/2002 | Baldwin et al. | ............. | 422/105 |
| 2003/0170506 A1 * | 9/2003 | Gilbert | ......................... | 429/12 |

FOREIGN PATENT DOCUMENTS

JP 2002-221090 11/2001

OTHER PUBLICATIONS

S. Nakano et al, Development of a 150 Kw Microtur4bine System, Nov. 9-13, 2003, Proceedings of the International Converence on Power Engineering-03 (ICOPE-03).

S. Dodo et al., Development of an Advanced Microturbine System Using Humid Air Turbine Cycle, Jun. 14-17, 2004, Procedings of ASME Turbo Expo 2004, Power for Land, Sea and Air, Vienna, Austria, pp. 1-8.

Japan Office Action dated May 9, 2008 (no translation provided).

* cited by examiner

*Primary Examiner*—Michael Cuff
*Assistant Examiner*—Andrew Nguyen
(74) *Attorney, Agent, or Firm*—Mattingly & Malur, P.C.

(57) ABSTRACT

Provided is a gas turbine power plant in which a rotor of a generator is journalled by water lubrication bearings into which a part of cooling water for cooling the generator is fed. Since the lubrication water has a viscosity lower than that of lubrication oil, it is possible to provide a gas turbine power plant with less energy loss resulting in lower power consumption for accessories, and in high power generation efficiency.

17 Claims, 15 Drawing Sheets

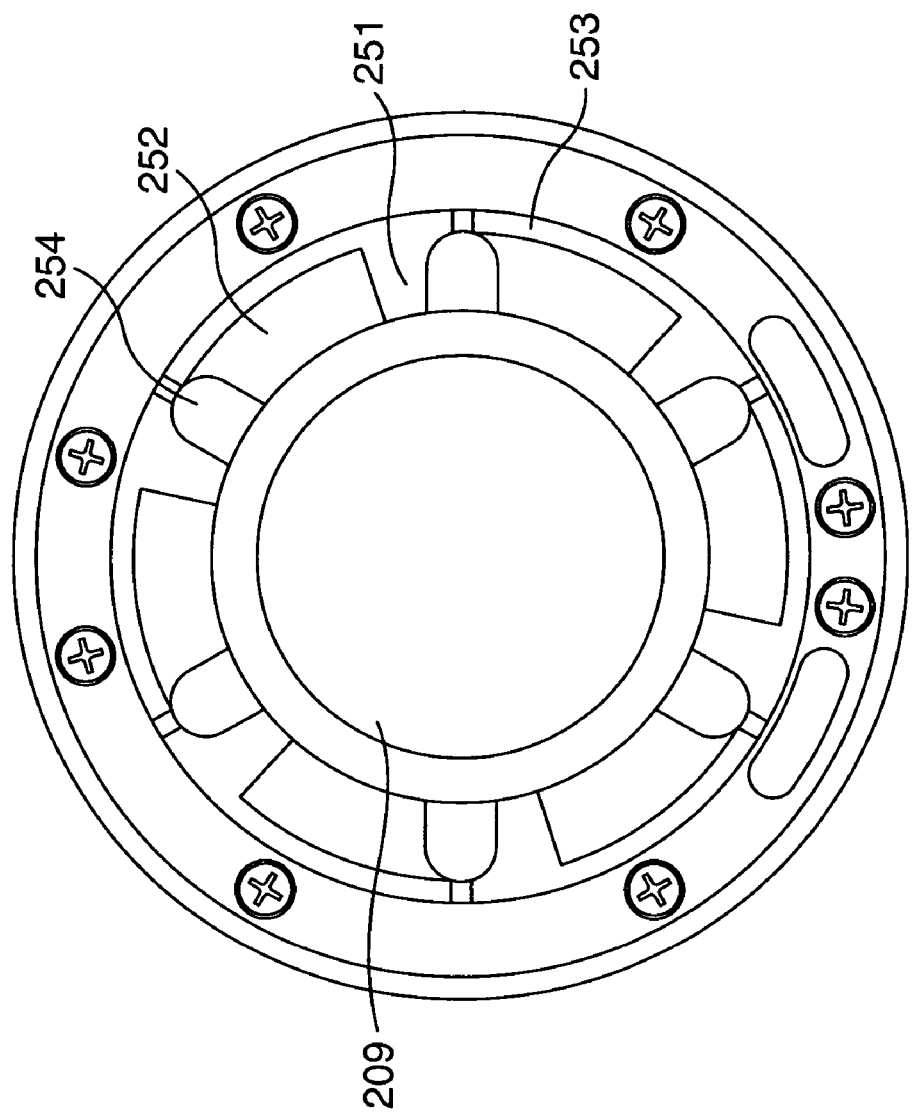
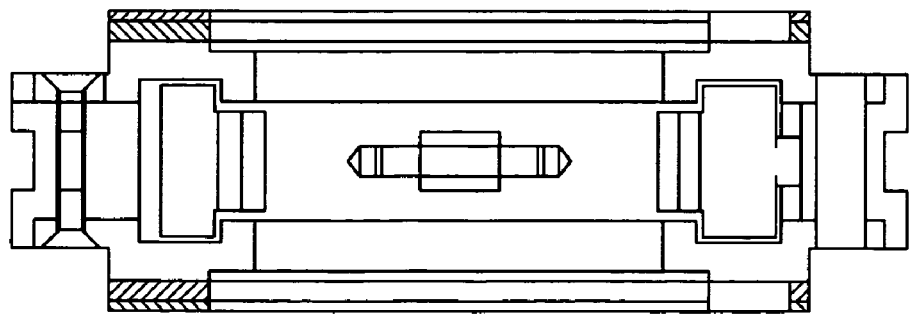

GAS TURBINE POWER PLANT

BACKGROUND OF THE INVENTION

The present invention relates to a gas turbine power plant which is preferably used as a private power plant installed in a building for a shop, a hospital or the like.

In general, of gas turbine power plants used as private power plants, a turbine power plant having a relatively large capacity utilizes oil lubrication bearings as bearings for a generator, as disclosed in JP-A-2002-221090. The gas turbine power plant having the oil lubrication bearings as disclosed in the above-mentioned document, causes a high energy loss through the bearings due to viscosity of lubrication oil, and in addition, since a lubrication oil feed pump requires a higher power for feeding the lubrication oil to the bearings, power consumption for driving accessories becomes large. As a result, the efficiency of power generation of the gas turbine power plant having the oil lubrication bearings is low.

SUMMARY OF THE INVENTION

An object of the present invention is to provide a gas turbine power plant which can enhance the efficiency of power generation.

To the end, according to a first aspect of the present invention, there is provided a gas turbine power plant, comprising a compressor for compressing air, a combustor for mixing fuel into the compressed air so as to burn the fuel, a gas turbine driven by gas generated by the combustor, a generator having a rotor journalled by water lubrication bearings, and adapted to be driven by the gas turbine, a cooling water circulating means for cooling the generator, a cooling water supply means for feeding cooling water into the water lubrication bearings from the cooling water circulating means.

Further, according to a second aspect of the present invention, there is provided a gas turbine power plant comprising a compressor having an suction side and a discharge side, for compressing air, a combustor for mixing fuel into the compressed air so as to burn the fuel, a gas turbine driven by gas generated by the combustor, a regenerative heat-exchanger for carrying out heat-exchange between exhaust gas from the gas turbine and the compressed air discharged from the compressor, a generator having a rotor journalled by water lubrication bearings, and adapted to be driven by the gas turbine, a power conversion unit for converting an output power from the generator into a commercial frequency power, a cooling water circulating means for feeding cooling water from a cooling water tank into the generator by way of a heat radiator so as to cool the generator, and for thereafter returning the cooling water into the cooling water tank, a lubrication water supply means for feeding cooling water fed from the cooling water circulating means by way of the heat radiator, and a spray water feeding means for feeding spray water into the suction side and the discharge side of the compressor.

With the configuration of the present invention as stated above, in which a part of cooling water used for cooling the generator is fed as lubrication water into the water lubrication bearings journalling the rotor thereof, that is, the lubrication water having low viscosity is used in comparison with the oil lubrication bearings, energy loss through the bearings and power consumption for accessory can be reduced, thereby it is possible to enhance the efficiency of power generation of the gas turbine power plant.

Further, with the configuration of the present invention as stated above, in which spray water is fed into the suction side and the discharge side of the compressor, air fed into the compressor is mixed with the spray water so as to lower the temperature of the air fed into the compressor while increasing the mass of the air, and further, the compressed air discharged from the compressor is also mixed with the spray water so as to lower the temperature of the discharged compressed air, resulting in enhancement of the thermal efficiency of the regenerative heat-exchanger. As a result, the temperature of compressed air fed into the combustor can be increased, thereby it is possible to enhance the efficiency of power generation of the gas turbine power plant.

Further, since the spray water supply means is provided with an impurity removing means for removing impurities contained the water used in the gas turbine power plant, and accordingly, the purity of the water to be used can be enhanced thereby it is possible to prolong the use lives of components to be fed with the water. As a result, it is possible to prevent the efficiency of power generation of the gas turbine power plant.

Explanation will be herein below made of several embodiments of the present invention with reference to the accompanying drawings.

other objects, features and advantages of the invention will become apparent from the following description of the embodiments of the invention taken in conjunction with the accompanying drawings.

BRIEF DESCRIPTION OF SEVERAL VIEWS OF THE DRAWING

FIGS. 15a and 15b are sectional views illustrating an example of a bearing used as a water lubrication bearing 10B.

DESCRIPTION OF PREFERRED EMBODIMENTS

Figure 1:
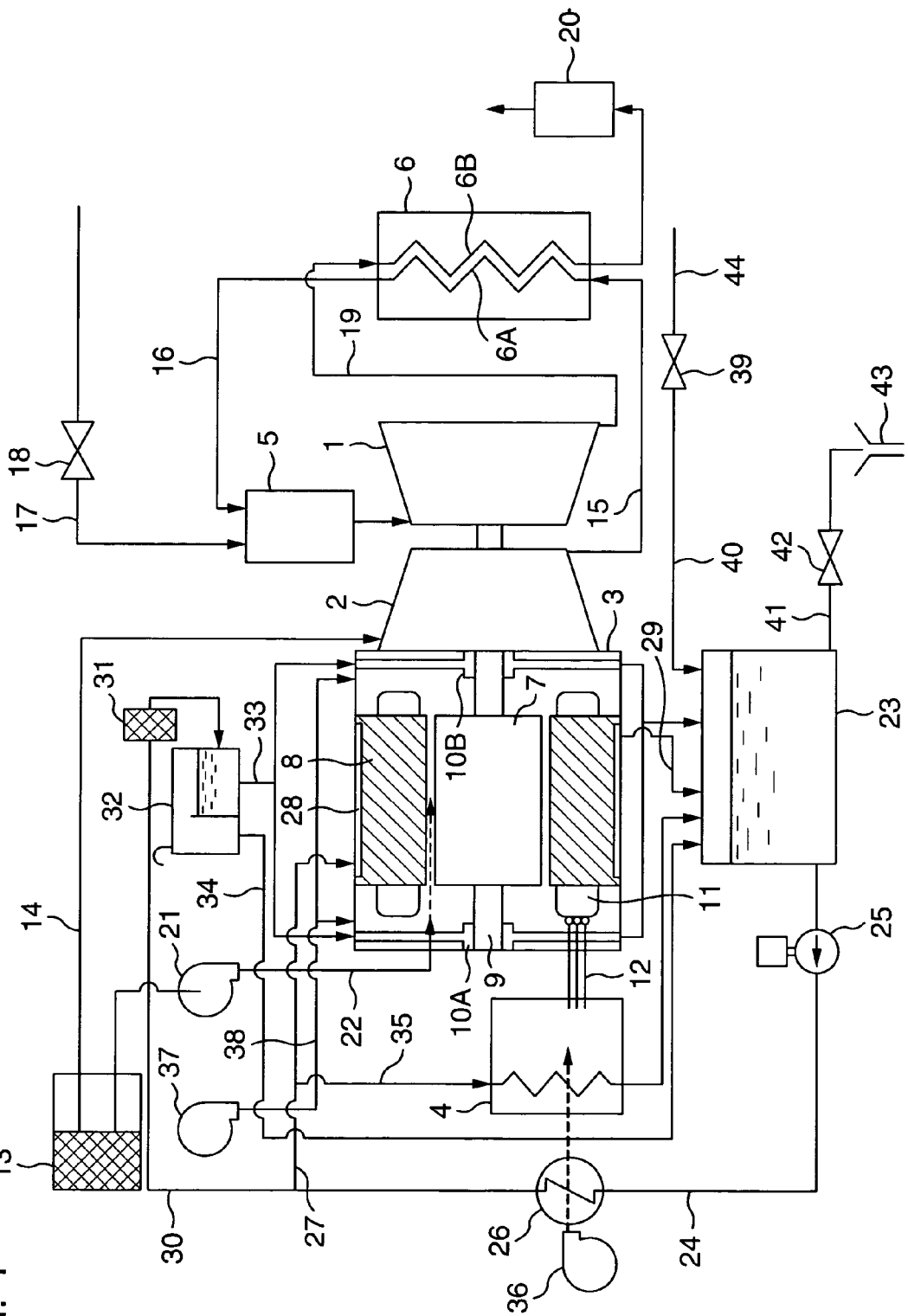
FIG. 1 is a block diagram illustrating a gas turbine power plant in a first embodiment of the present invention.

Explanation will be hereinbelow made of a gas turbine power plant in a first embodiment of the present invention, as shown in FIG. 1.

Referring to FIG. 1, the gas turbine power plant mainly composed of a gas turbine 1, a compressor 2 coaxial with the gas turbine 1, a generator 3 coaxial with the compressor 2, a power converter 4 for converting an output power generated by the generator 3 into a power depending upon a load, a combustor 5 for mixing compressed gas produced from the compressor 2 with fuel which is fed separately so as to burn the fuel so as to produce combustion gas which is then fed into the gas turbine 1, a regenerative heat-exchanger 6 for heat-exchange between exhaust gas from the gas turbine 1 and the compressed gas from the compressor 3.

The generator 3 is a permanent magnet type three-phase a.c. generator composed of a rotor 7 incorporating permanent magnets for generating magnetic fields, and a stator 8 surrounding the rotor 7. The rotor 7 has a rotary shaft 9 which is coaxial with the gas turbine 1 and the compressor 2, and which is rotatably journalled by water lubrication bearings 10A, 10B supported in a housing that holds therein the stator 8. Further, the stator 8 has stator windings 11 which is connected to the power converter 4 through power lines 12.

The above-mentioned power converter 4 is a two-way converter which converts an a.c. power from the generator 3 into a d.c. power, and then converts the latter into an a.c. power corresponding to a commercial power source, and further, in the case of using the generator 3 as a motor, converts the a.c. commercial power into a d.c. power, and then it converts the latter into an a.c. power corresponding to a power source for the generator 3. That is, it includes both converter and inverter.

The above-mentioned compressor 2 is fed thereinto with ambient air which is sucked through a filter 13 by way of a supply pipe 14. The fed ambient air compressed by the compressor 2 and is led into a heat absorption pipe 6A in the regenerative heat-exchanger 6 by way of a discharge pipe 15. The ambient air heated by the heat absorption pipe 6A is discharged through a pipe line 16 and into the combustor 5 in which the air is mixed with fuel fed from a fuel supply pipe 17, and accordingly, the fuel is burnt therein. The fuel supply pipe 17 is connected therein with a shut-off valve 18 for feeding and cutting off the fuel. The combustion gas from the combustor 15 is fed into the gas turbine 1 so as to apply a torque to a rotor (which is not shown) of the gas turbine 1.

Exhaust gas which has driven to rotate the gas turbine 1 is fed into a heat radiation pipe 6B in the regenerative heat-exchanger 6 by way of the exhaust pipe 19 so as to carry out heat-exchange between itself and the heat absorption pipe 6A. The exhaust gas having passed through the heat radiation pipe 6B is exhausted outside by way of a muffler unit 20.

It is noted that apart of the ambient air sucked through the filter 13 is fed into the generator 3 by way of a blower 21 and a pipe line 22 in order to cool the rotor 7.

Meanwhile, the basic configuration of a cooling water circulation means for cooling the generator 3, a cooling water tank 23 for reserving therein cooling water, a pipe line 24 for feeding water from the cooling water tank 23, a water circulation pump 25 for pressurizing water in the pipe line 24, a heat radiator 26 for cooling pressurized water in the pipe line 24, a pipe line 27 for feeding the water having passed through the heat radiator 26, into the stator 8 of the generator 3, a cooling jacket 28 communicated with the pipe line 27 and formed in the stator 8, and a pipe line 29 for returning discharge water from the cooling jacket 28 into the cooling water tank 23.

A part of water having passed through the heat radiator 26 in the cooling water circulating means which is configured as mentioned above, branches off through a pipe line 30 and is once reserved in a lubrication water tank 32 located at a position above the above-mentioned water lubrication bearings 10A, 10B after it passes through a filter 31 for removable of impurities. This lubrication water tank 32 is opened to the atmosphere. The lubrication water having once reserved in the lubrication water tank 32 is fed into the water lubrication bearings 10A, 10B by way of a pipe line 33 under a potential energy which is always constant without affection by pulsation of the water circulation pump 25. With this configuration in which the lubrication water is fed under a constant potential energy, the lubrication water can be fed into the water lubrication bearings 10A, 10B until the power plant comes a complete stop when the water cannot be fed even through the water circulation pump 25 is stopped due to a power failure or the like. Thereby it is possible to prevent occurrence of seizure between the rotary shaft 9 and the water lubrication bearings 10A and 10B, which is caused by insufficient lubrication water.

As stated above, the cooling water circulating means is added thereto with a lubrication water supply means composed of the pipe line 30, the filter 31, the lubrication water tank 32 and the pipe line 33.

It is noted that lubrication water may be fed into the lubrication water bearings 10A, 10B, direct through the pipe line 33 without being reserved in the lubrication water tank 32 after passing through the filter 31 if the supply of the lubrication water into the water lubrication bearing is insufficient under the dead weight of the lubrication water. Further, extra lubrication water in the lubrication water tank 32 is returned into the cooling water tank 23 by way of a pipe line 34. Further, cooling water having lubricated and cooled the water lubrication bearings 10A, 10B is returned into the cooling water tank 23.

In addition, a pipe line 35 branches from the pipe line 27, and accordingly, the cooling water cools the power converter 4 and is thereafter returned into the cooling water tank 23.

Further, the heat radiator 26 is provided therein with a blower 36 which cools the heat radiator 26 by the ambient air that is then fed for cooling the power converter 4, accessories (which are not shown) provided in the gas turbine power plant, and the generator 3.

In order to restrain the lubrication water from the water lubrication bearings 10A, 10E from scattering inside and outside of the generator 3, the ambient air is led into the pipe line 38 by the blower 37 for cooling the generator 3 with the ambient air fed through the pipe line 38, and accordingly, it is possible to prevent the water scattering from the water lubrication bearings 10A, 10B, flooding the stator winding 1 side.

The ambient air led by the blower 37 is fed between an end face of the stator windings 11 and the water lubrication bearings so as to form an air-curtain-like seal surface in order to prevent scattering water from the water lubrication bearings from entering into the stator windings side.

Further, drain water from the cooling water tank 23 is led into a drain port 43 by way of a pipe line 41 and a valve 42. The cooling water tank 23 is connected thereto with a water supply pipe line 40 through a valve 39 to which a water supply pipe line 44 is connected.

Explanation will be hereinbelow made of the operation of the gas turbine power plant as configured as mentioned above. An a.c. commercial power is fed from a power source system which is not shown, to the power converter 4 so as to drive the generator 3 as a motor for driving the compressor 2 and the gas turbine 1. As the rotational speed of the rotary shaft 9 is increased, the pressure of the ambient air from the compressor 3 is increased, and accordingly, when the rotational speed of the rotary shaft 9 reaches a specified value or when the discharge pressure of the ambient air from the compressor 2 reaches a specified discharge pressure, the shut-off valve 18 is opened so as to feed the fuel through the fuel supply pipe 17. The fuel and the discharged ambient air from the compressor 2 is mixed and burnt in the combustor 5. The combustion gas from the combustor 5 carries out expansion within the gas turbine 1 so as to apply a torque to the rotary shaft 9 and to raise the temperature of the ambient air discharged from the compressor 2 in the regenerative heat-exchanger 6, and is then exhausted outside. When the gas turbine 1 is driven by the combustion gas so as to start the power generation by the generator 3, the power fed from the a.c. commercial power source system is ceased, and accordingly, the power supply to a load connected to the a.c. commercial power source system is started.

As the gas turbine power plant as stated above, is operated, the generator 3 and the power converter 4 generate heat. In order to cool the generated heat and to feed water to the water lubrication bearings 10A, 10B, the water circulation pump 26 is driven to feed the water from the cooling water tank 23 under pressure before the start of the gas turbine 1. The water fed under pressure is cooled through the heat radiator 26 and is then fed into the cooling jacket 28 formed in the stator 8 of the generator 3 by way of the pipe line 27. After cooling the stator 8, it is returned into the cooling water tank 23. Meanwhile, a part of the water having passed through the heat radiator 26 is fed into the water lubrication bearings 10A, 10B by way of the pipe lines 30, 33 so as to lubricate and cool the same, and is then returned into the cooling water tank 23.

As stated above, with the configuration of this embodiment in which the cooling water from the cooling water circulating means for cooling the generator 3 is used for cooling and lubricating the bearings, the lubrication and the cooling can be made by water with low viscosity in comparison with that of lubrication oil conventionally used, thereby it is possible to remarkably reduce energy loss in the bearings. Further, since a part of the water which cools the generator 3 is used for lubricating the bearings, the necessity of a pipe line, a circulation pump and the like exclusively used for the lubrication can be eliminated, and the power consumption of the circulation pump for the supply of the lubrication water can be less than that for the supply of lubrication oil. Further, in this embodiment, the lubrication water which has been cooled by the heat radiator 26 is fed into the bearings. Thus, since the water lubrication bearings using water as lubricant has a performance inferior to that of oil lubrication bearings in view of the proof load of the bearings, sufficient supply of lubrication water is required for the bearings during the operation of the gas turbine power plant. However, should the lubrication water be fed in a boiling condition, that is, should the same be fed into the bearings in a gas-liquid mixing condition, the lubrication water would not be sufficiently distributed in the bearings, that is, it would not sufficiently serve as lubricant. In view of this matter, in this embodiment, there is provided the heat radiator 26 for cooling the lubrication water to be fed into the water lubrication bearings 10A, 10B, thereby it is possible to prevent the lubrication water from boiling. Thus, since the lubrication water can be fed into the bearings in a liquid phase, it is possible to maintain the advantage as to the lubricating function owned by the water lubrication bearings and as well to attain the task of the proof-load as stated above. Further, should the pump for feeding lubricant to the bearings come to a stop due to a failure or the like, conventional oil lubrication bearings would cause solidification of oil due to a high temperature. On the contrary, according to this embodiment, since the water is used as a lubricant, even though the pump comes to a stop, the water in the bearings evaporates, thereby it is possible to restrain the reliability of the bearings from lowering. As a result, thereby it is possible to enhance the efficiency of the power generation of the gas turbine power plant.

Further, since the number of components for oil lubrication can be reduced, the necessity of inspection and maintenance therefor can be eliminated, thereby it is possible to reduce the maintenance costs.

In addition, with the configuration of this embodiment, the power converter, the accessories (which are not shown) provided in the gas turbine power plant, and the generator 3 can be cooled by air stream from the blower 36 for cooling the heat radiator 26.

Thus, in this embodiment, the water lubrication bearings are used, and a part of the cooling water used for cooling the power generation facility is used for the water lubrication bearings. Energy loss in the bearings due to the viscosity of lubrication oil used for conventional oil lubrication bearings, and power consumption for accessories for supply of lubrication oil can be eliminated, thereby it is possible to enhance the efficiency of power generation of the gas turbine power plant.

Next, detailed explanation will be made the structures of the water lubrication bearings 10A, 10B with reference to FIGS. 14a to 15b.

Figure 14B:
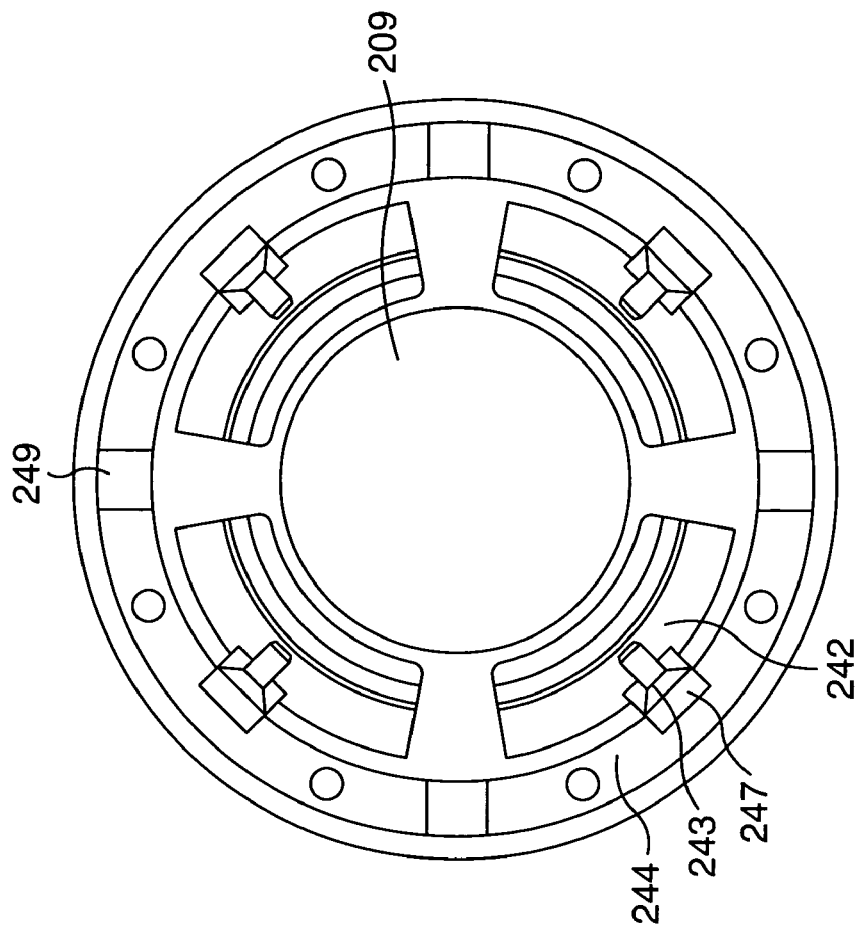
FIGS. 14a and 14b are sectional views illustrating an example of a bearing used as a water lubrication bearing 10A.
Figure 14A:
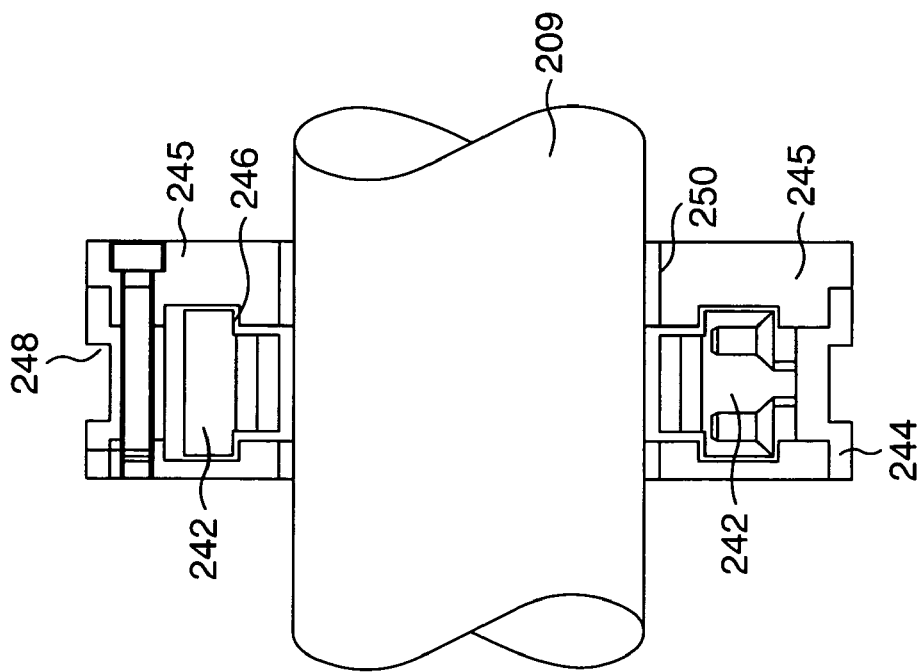

FIG. 14a which is a sectional view, as viewed from the shaft side surface, illustrating the water lubrication bearing 10A, and FIG. 14b is a sectional view, as viewed from the shaft end surface. A micro-turbine running at a high speed would possibly cause unstable oscillation such as whips. Accordingly, in this embodiment, as shown in FIGS. 14a and 14b, a tilt pad bearing is used as the journal bearing. The tilt pad bearing is composed of four pads. The pads 242 for supporting a generator rotor 209 are housed in a bearing casing 244, and are prevented from dropping, by grooves 246 formed in side covers 245. The pads 242 are provided on their rear surfaces with pivots 243 which are inserted in recesses 247 formed in the bearing casing 244 so as to be positioned and which are tiltable in both rotating and shaftwise directions.

The lubrication water flows through a water feed groove 248 formed in the outer periphery of the bearing casing 244, and is then fed into the pad 242 through water feed holes 249 formed between the pads 242 in the bearing casing 244. The lubrication water is discharged onto the side surfaces of the pads 242, and downstream in the rotating direction after it lubricates between the pads 242 and the generator rotor 209. Drain water discharged from the pads 242 is drained outside from seal parts 250 provided to the side covers 245. A material used for a slide surfaces of the bearings of the micro-turbine is a heat-resistance material such as PEEK (Poly-Ether-Ether-Ketone) resin.

FIGS. 15a and 15b show an example of a bearing used as the water lubrication bearing 10B. FIG. 15a is a sectional view as viewed from the shaft side surface, and FIG. 15b is a sectional view as viewed from the shaft end surface. The water lubrication bearing 10B has to also bear a thrust load, and accordingly, is composed of a journal bearing and thrust bearings. In addition to the journal bearing shown in FIG. 14, thrust bearings are provided on both sides of the journal bearing. As the thrust bearings, taper land bearings having a high load-resistance are used.

A taper land bearing shown in FIG. 15 is composed of 6 segments including land parts 251 making contact with a water feed grooves 254, and tapered parts 252 provided with an outer peripheral seal parts 253 with having a height equal to that of the land parts 251.

Figure 2:
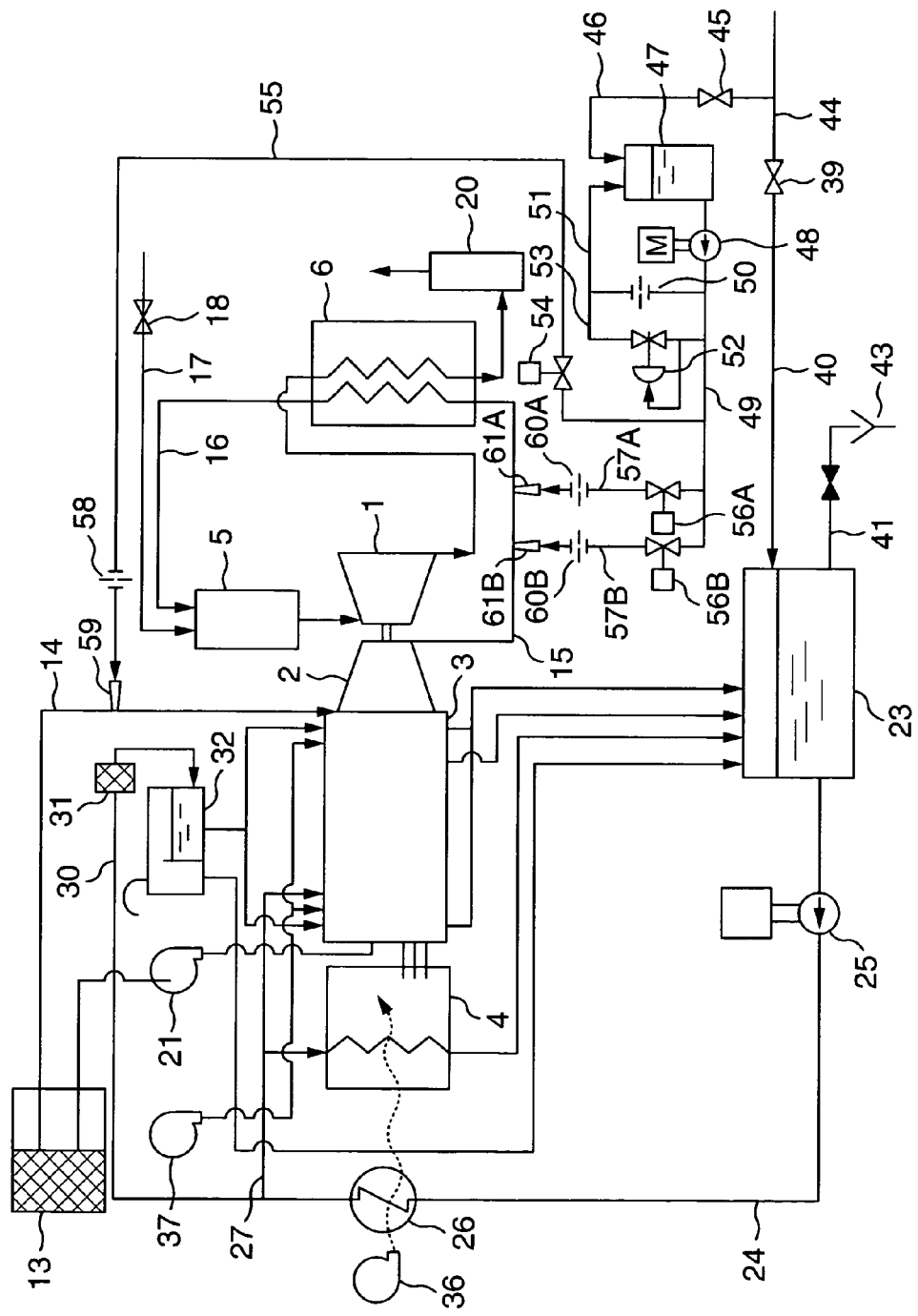
FIG. 2 is a block diagram illustrating a gas turbine power plant in a second embodiment of the present invention.

Referring to FIG. 2 which shows a gas turbine power plant in a second embodiment of the present invention, the configuration of this embodiment is the same as the first embodiment, that is, water lubrication bearings are used as the bearings of the generator 3 and a part of water from the cooling water circulation means for cooling the generator is used for the water lubrication bearings while the blowers 21, 36, 37 are used, except the provision of a spray water feeding means for feeding spray water into the suction side and the discharge side of the compressor 2 in order to further enhance the efficiency of power generation of the gas turbine power plant. That is, briefly, by feeding spray water into the air fed into the compressor 2, the temperature of the fed air is lowered while the intake mass of the compressor is increased, and further, by cooling and humidifying the discharge air from the compressor 2 with the spray water, the efficiency of heat-exchange in the regenerative heat-exchanger can be enhanced. Thus, the air having a high temperature can be fed into the combustor 5, thereby it is possible to enhance the efficiency of power generation of the gas turbine power plant.

Explanation will be specifically made of the above-mentioned configuration with reference to FIG. 2. A pipe line 45 branches from the water supply pipe line 44 connected to the pipe line 40 which is connected to the cooling water tank 23, upstream of the valve 39, and is connected thereto with a spray water tank 47 by way of a valve 45. This spray water tank 47 is connected thereto with a water feed pipe 49 by way of a spray water pump 48. The water feed pipe 49 is connected on the upstream side thereof with a pipe line 51 through which water is returned into the spray water tank 47, by way of an orifice 50. A pipe line 53 branches from the water feed pipe 49 downstream of the orifice 50, and is connected to the pipe line 51 by way of a back pressure regulating valve 52. Further, a pipe line 55 incorporating a valve 54 branches off from the water feed pipe 49 downstream of the back pressure regulating valve 52, and pipe lines 57A, 57B respectively incorporating valves 56A, 56B branch therefrom downstream of the branching portion of the pipe line 55. The pipe line 55 is connected on the downstream side thereof with a spray water nozzle 59 through the intermediary of an orifice 58, and the spray water nozzle 59 is opened to the water supply pipe 14 as a suction side pipe line for the compressor 2. The pipe lines 57A, 57B are connected on the downstream side thereof with spray water nozzles 61A, 61B through the intermediary of orifices 60A, 60B, and the spray water nozzles 61A, 61B are opened to the discharge pipe 15 for the compressor 2. The circulating system incorporating the orifice 50 is a shut-off operation preventing circulation system for the spray water pump 48, and accordingly, water is circulated by a minimum quantity in order to prevent seizure of the spray water pump 48 even though the spray water pump 48 is continuously operated in a condition in which the valves 54, 56A, 56B are all closed. Further, the back pressure regulating valve 52 is adapted to apply a regulated pressure to the spray water nozzles 59, 61A, 61B, irrespective of an open and closed condition of the downstream side valves 54, 55A, 56B.

Next, explanation will be made of the operation of the above-mentioned spray water supply means. When the operation of the spray water pump 48 is started while the valve 54 is opened, water reserved in the spray water tank 47 is fed under pressure through the pipe line 55 and to the orifice 58 where the water is restricted, and is then sprayed into the supply pipe line 14 for the compressor 2 from the spray water nozzle 59. This spray water can decrease the temperature of air on the suction side of the compressor 2 and increase the air flow rate by the spray water, thereby it is possible to enhance the compression performance of the compressor 2. Meanwhile, when the valves 56A and/or 56B are opened, spray water is injected into the discharge pipe 15 for the compressor 2 by way of the orifices 60A and/or 60B, and the spray water nozzles 61A and/or 61B. This spray water can reduce the temperature of air discharged into the regenerative heat-exchanger 6 from the compressor 2, thereby it is possible to enhance the efficiency of heat-exchange between the air and exhaust gas from the gas turbine 1 within the regenerative heat-exchanger 6, and to increase the discharge flow rate of the compressor 2. With this configuration, the efficiency of heat-exchange with the exhaust gas from the gas turbine 1 can be enhanced so as to enhance the efficiency of heart-recovery from exhaust gas, and as a result, it is possible to enhance the efficiency of power generation of the gas turbine power plant.

As stated above, the second embodiment can exhibits the same technical effects and advantages as that of the first embodiment, and further, the efficiency of power generation of the gas turbine power plant can also been enhanced.

It is noted that although explanation has been made of the spray water supply system incorporating the two spray water nozzles 61A, 61B on the discharge side of the compressor 2 in the second embodiment, more than two spray water nozzles may be provided in the spray water supply system in order to increase the quantity of spray water.

Figure 3:
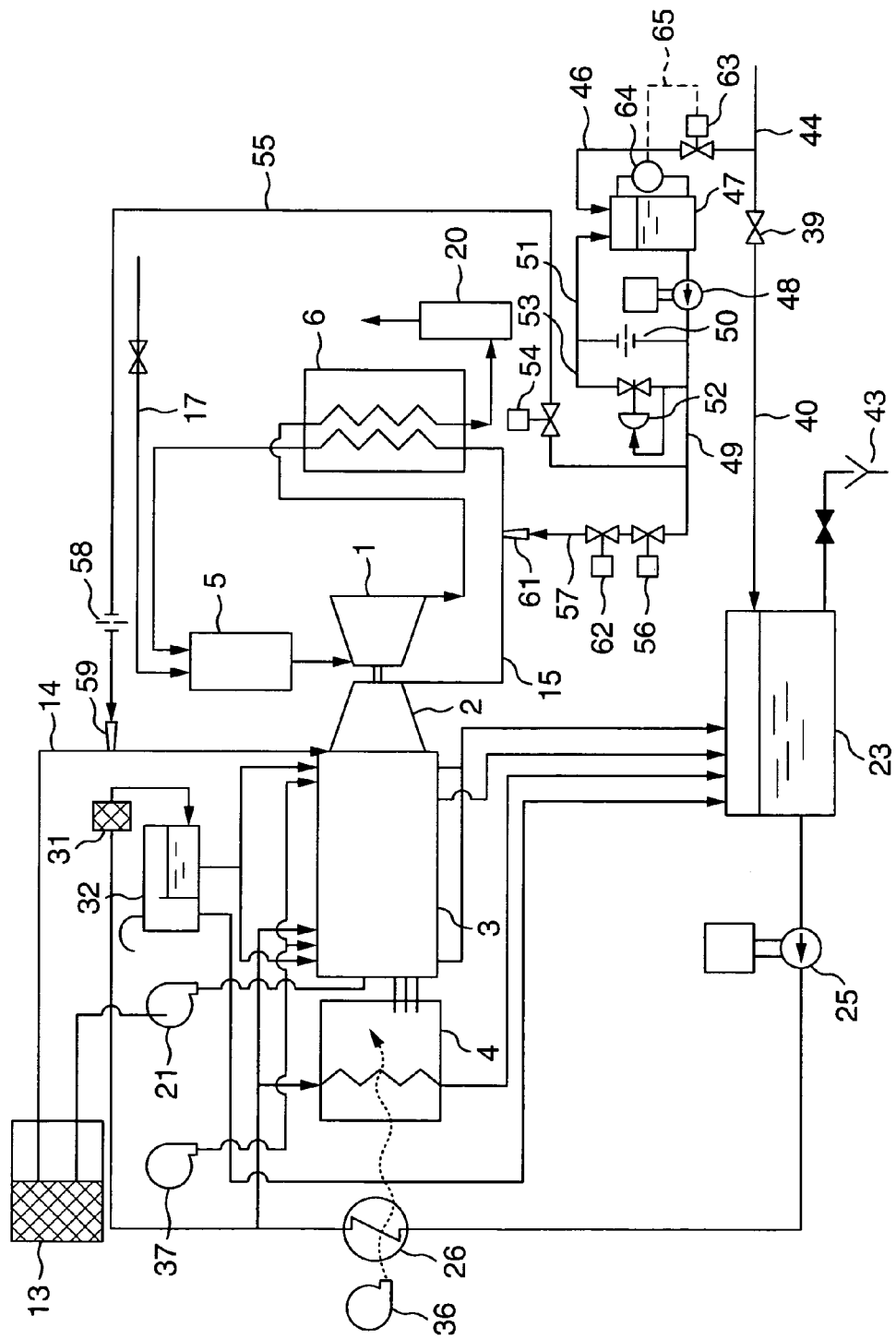
FIG. 3 is a block diagram illustrating a gas turbine power plant in a third embodiment of the present invention.

Referring to FIG. 3 which shows a gas turbine power plant in a third embodiment of the present invention, the configuration of the third embodiment is basically the same as that of the second embodiment shown in FIG. 2, except the following two points: that is, as a first point, the provision of a flow regulating valve 62 in the pipe line 57 for the spray water nozzle 61 opened to the discharge pipe 15 for the compressor 2, downstream of the valve 56, and as a second point, the provision of such a configuration that a water level detected by a level gage 64 provided in the spray water tank 47 is transmitted to a valve 63 which is provided in the pipe line 46 branching from the water supply pipe line 44, and which is therefore opened and closed in dependence upon a water level in the spray water tank 47. It is noted that a plurality of pipe lines 57 for the spray water nozzle 61, each being provided with the flow regulating valve 62 may be provided.

According to this embodiment, there may be exhibited technical effects and advantages the same as those exhibited by the first embodiment, and further, since the flow rate of the spray water fed to the discharge side of the compressor 2 can be controlled by the flow regulating valve 62, an appropriate quantity of the spray water can be fed in a versatile operating condition, thereby it is possible to enhance the efficiency of power generation of the gas turbine power plant over a wide range of operating conditions. Further, water can be automatically fed into the spray water tank 47, and accordingly, the spray water can be continuously fed with no interruption.

Figure 4:
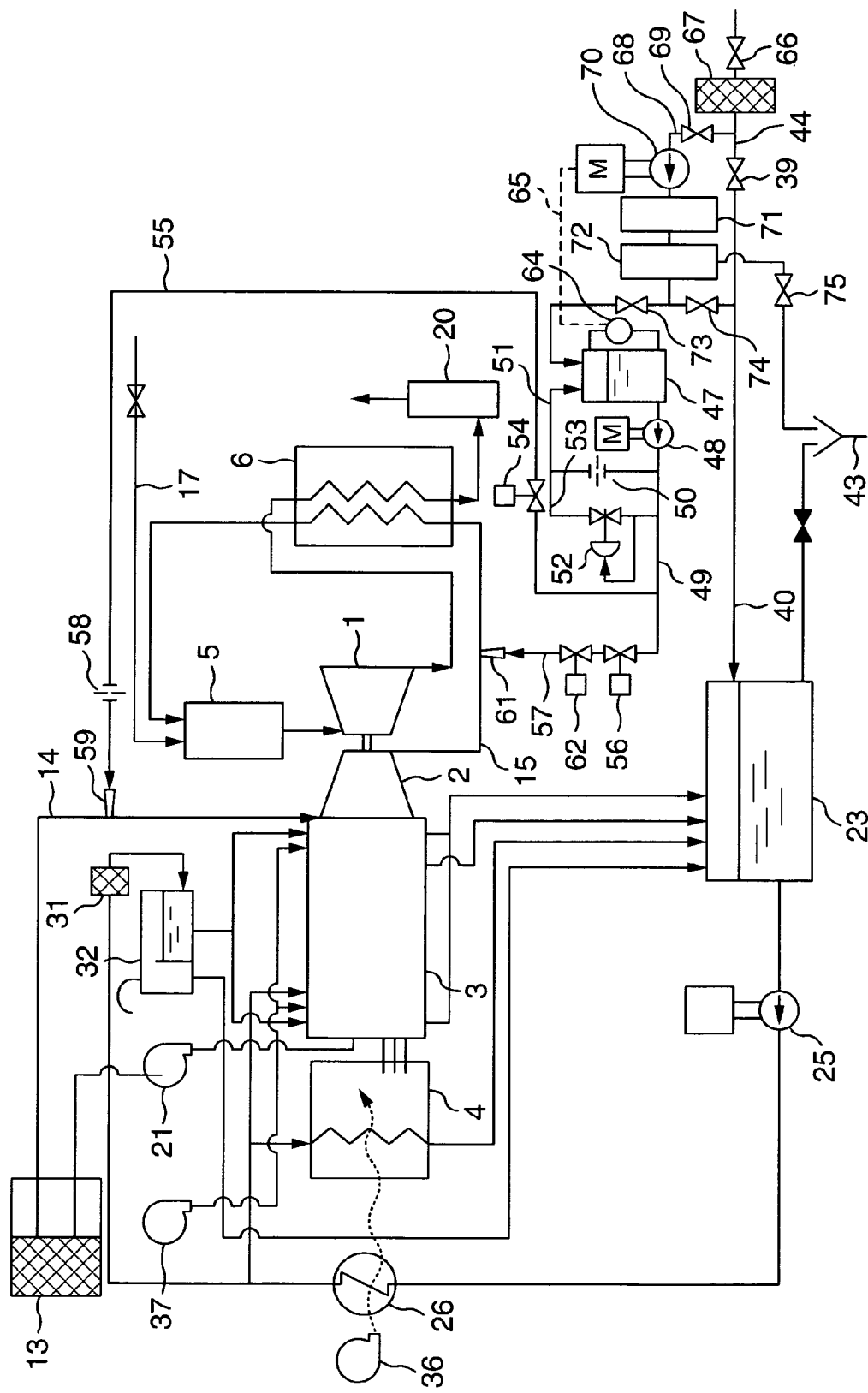
FIG. 4 is a block diagram illustrating a gas turbine power plant in a forth embodiment of the present invention.

Referring to FIG. 4 which shows a gas turbine power plant in a fourth embodiment of the present invention, the configuration of the fourth embodiment is basically the same as that of the third embodiment, except such a configuration that water is fed into the spray water tank 47 by way of an impurity removal means.

Explanation will be specifically made of the fourth embodiment, the pipe line 40 connected to the cooling water tank 23 is connected thereto with the water supply pipe 44 which is provided with a shut-off valve 66 and a filter 67 and from which a pipe line 68 branches between the filter 67 and the valve 39. The pipe line 68 is connected on the downstream side thereof with a valve 69, a water feed pump 70, a chlorine removable filer 71 and a reverse osmosis membrane filter 72 in the mentioned order, and is communicated with the spray water tank 47 through the intermediary of a valve 73 on one hand, and with the pipe line 44 connected to the cooling water tank 23, through the intermediary of a valve 74 on the other hand, downstream of the reverse osmosis membrane filter 72. Further, drain water from the reverse osmosis membrane filter 72 is led into the drain port 43 by way of a valve 75. The level gage 64 provided in the spray water tank 47 is electrically connected to the water feed pump 70 through the signal line 65, and accordingly, the water feed pump 70 is operated under turn-on and -off control in response to a water level detection signal from the level gage 64.

Figure 5A:
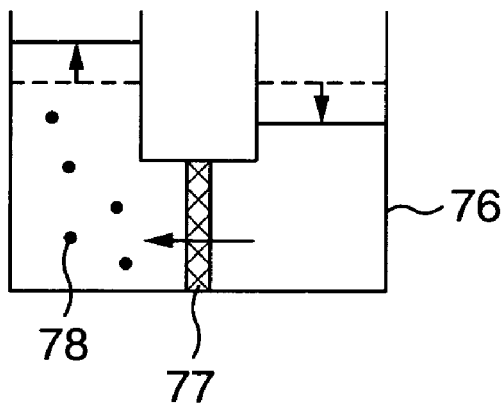
FIGS. 5a and 5b are views which show the principle of the operation of a reverse osmosis membrane filter shown in FIG. 4.
Figure 5B:
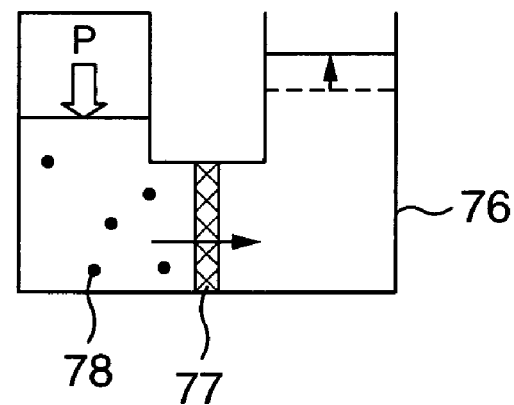

The reverse osmotic membrane filter 72 includes a porous membrane made of polymer material, as a reverse osmosis membrane, and accordingly, water is forced through the porous membrane under the application of pressure so as to remove impurities from the water. The principle of this configuration is shown in FIGS. 5a and 5b. Referring to FIG. 5a, a porous membrane 77 is provided in the bottom of an U-tube 76 which is opened to the atmosphere so as to parition the U-tube at the center of the bottom part thereof. Water is filled in this U-tube 76, the water levels are originally equal to each other on both left and right sides as indicated by the broken line. In a condition in which the U-tube 76 is opened to the atmosphere, water on the right side of the porous membrane, having a low concentration of impurities passes through the porous membrane and seeps into water having a high concentration of impurities 78 on the left side of the porous membrane. Further, as shown by the solid line in the figure, the water level of the water having a high concentration of impurities on the left side of the porous membrane ascends so as to a water level difference is caused between itself and the water having a low concentration of impurities. A pressure corresponding to the water level difference between the solutions on both sides of the porous membrane is called as an osmotic pressure. Meanwhile, as shown in FIG. 5b, one end of the U-tube 76 on the left side in which the impurities 78 is accumulated is blocked, and is then applied with a pressure P which is higher than the osmotic pressure. Only water can pass thought the porous membrane 77 and into the left side of the latter in which the pressure is low while the impurities dissolved in the water is left on the left side due to filtration. Thus, the purity of the water on the right side of the U-tube 76 can be enhanced.

In the configuration of the fourth embodiment of the present invention shown in FIG. 4, the water having a high purity and obtained through the osmotic membrane filter 72 is fed into the spray water tank 47 and the cooling water tank 23, while the water in which impurities are solved so as to have a high concentration of impurities is drained through the drain port 43 by opening the valve 75.

As a result, since hard components such as silica, potassium or the like and sodium components can be removed from water sprayed into the suction side and the discharge side of the compressor 2, micropores of the spray water nozzles 59, 61 can be prevented from being blocked due to build-up of the hard components, thereby it is possible to stably spray water for a long time. In addition, finer nozzle holes can be used, and accordingly, the droplet size of the spray water can be decreased, thereby it is possible to surely evaporate the spray water. Further, since sodium and potassium can be removed from the water, and accordingly, the production of sodium sulfur which is a chemical compound with sulfur component contained in combustion gas can be restrained, thereby it is possible to prevent occurrence of high temperature corrosion of the regenerative heat-exchanger 6 caused by sodium sulfur. Thus, by removing impurities contained in the water used in the gas turbine power plant, the purity of the water can be enhanced so as to prolong the service life of accessories fed with the water. As a result, it is possible to prevent the efficiency of power generation of the gas turbine power plant from being lowered.

Figure 6:
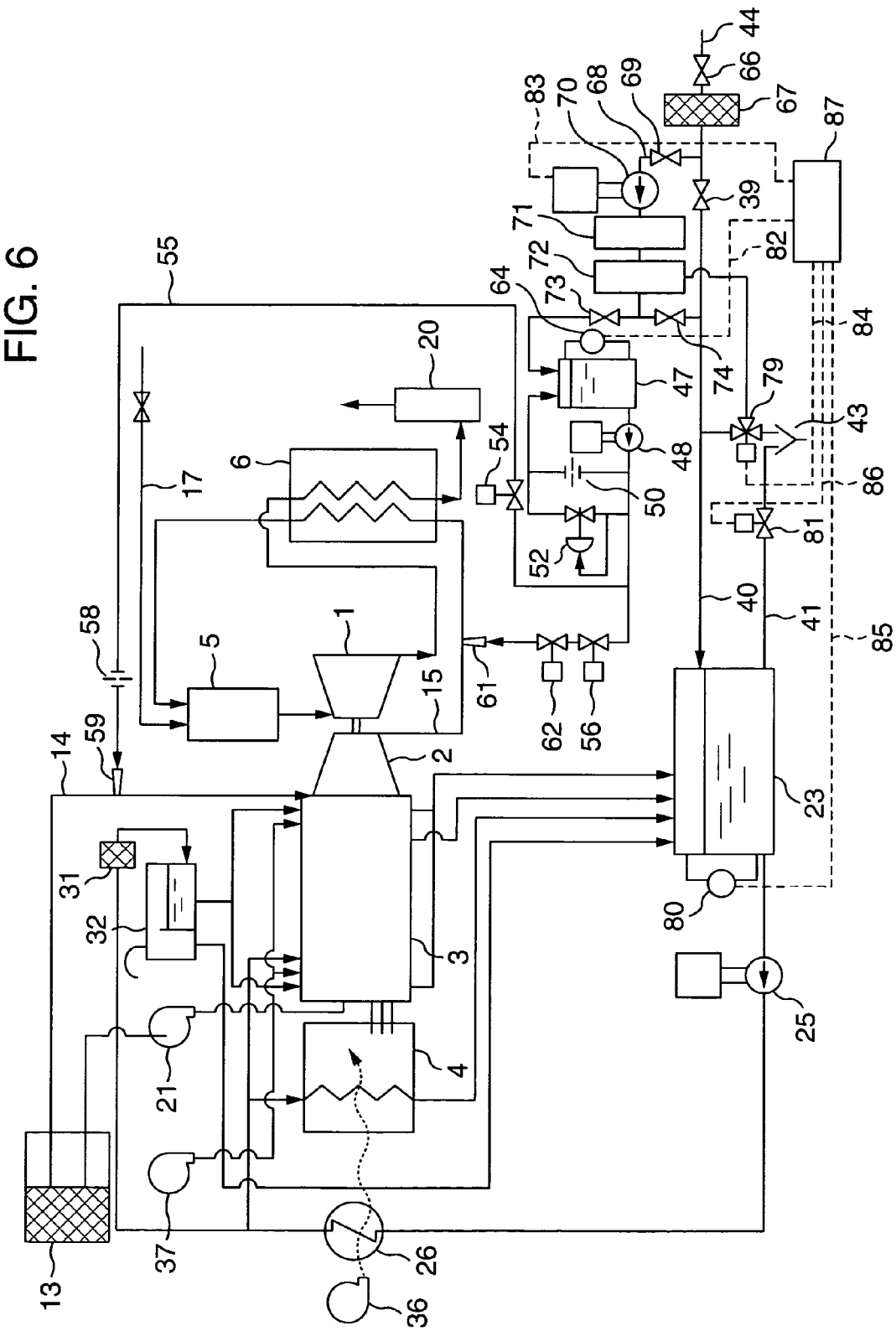
FIG. 6 is a block diagram illustrating a gas turbine power plant in a fifth embodiment of the present invention.

Referring to FIG. 6 which is a gas turbine power plant in a fifth embodiment of the present invention, the basic configuration of the fifth embodiment is the same as that of the fourth embodiment shown in FIG. 4, except the following two points: the first point is the provision of such a configuration that drain water from the reverse osmosis membrane filter 72 is led to the drain port 43 by way of a solenoid three-way valve 79 as a selector valve on one hand, and is led into the pipe line 40 connected to the cooling water tank 23 on the other hand, and the second point is the provision of such a configuration that a level gage 80 is provided in the cooling water tank 23 while a solenoid shut-off valve 81 is connected in the pipe line 41 for drainage from the cooling water tank 23, and a control unit 87 is connected thereto with the level gage 64 in the spray water tank 47, the water feed pump 70, the solenoid three-way valve 79, the level gage 80 in the cooling water tank 23 and the solenoid shut-off valve 81 through the intermediary of signal lines 82 to 86.

With the above-mentioned configuration, estimating that water for cooling the generator 3 and the power converter 4 and lubricating the water lubrication bearings (which are not shown in this figure) are fully reserved in the cooling water tank 23, upon operation of the gas turbine power plant in this condition, the valves 39, 74 are closed while the valves 66, 69, 73 are opened in order to feed the spray water into the suction side and the discharge side of the compressor 2. As a result, water is fed into the water feed pump 70 from the water supply pipe line 44 through the filter 67. At this stage, the water feed pump 70 is operated under instructions from the control unit 87 so as to feed high purity water into the spray water tank 47. At this time, the solenoid three-way valve 79 is opened so that drain water from the reverse osmotic membrane filter 72 is led to the drain port 43. Due to the detection of a water level by the level gage 64, when the water level in the spray water tank 47 comes to an appropriate level, the spray water pump 48 is driven while the valves 54, 56 are opened. Thus, the spray water is sprayed into the intake pipe 14 and the discharge pipe 15 for the compressor 2.

In this embodiment, during the spray water being sprayed, by changing over the solenoid three-way valve 79 so as to close its drain port side while opening the pipe line 40 side, drain water from the reverse osmosis membrane filter 72 is led through the pipe line 40 and into the cooling water tank 23. Then, the solenoid valve 81 is opened so that water in the cooling water tank 23 is drained from the drain port 43. At this stage, the level of the water in the cooling water tank 23 is monitored by means of the level gage 80, and accordingly, if the water level is excessively lowered, the solenoid valve 81 is closed, but if the water level is excessively raised, the solenoid three-way valve 79 is changed over so that the drain water from reverse osmosis membrane filter 72 is led to the drain port 43. With the repetitions of change-over of the solenoid three-way valve 79 and opening and closing of the solenoid valve 81 in response to a signal from the level gage 80 in the cooling water tank 23, the cooling water in the cooling water tank 23 can be replaced during the supply of the spray water into the suction side and the discharge side of the compressor 2.

As stated above, the configuration of this embodiment can exhibit technical effects and advantages the same as that obtained from the configuration of the fourth embodiment, and in addition, since the cooling water in the cooling water tank 23 can be replaced during the supply of the spray water, the quality and freshness of water in the cooling water tank 23 can be maintained. As stated above, removal of impurities from water sprayed from the spray nozzles is indispensable in order to prevent deposition of impurities in micro-holes in the nozzles and chemical combination with sulfur components contained in the combustion gas. Meanwhile, cooling water for the generator and lubrication water for the water lubrication bearings does not flow through the micro-holes in their passages, and are not made into direct contact with the combustion gas, and accordingly, there would be caused no particular problems even though drain water from the reverse osmotic membrane filter are used therefor, that is, it is desirable to use the drain water in view of effective use of water fed into the power plant.

As a result, deposition of scales and generation of microorganisms in the cooling water tank 23 can be prevented, thereby it is possible to reduce the frequency of maintenance of the gas turbine power plant and to aim at effectively utilizing the water.

Figure 7:
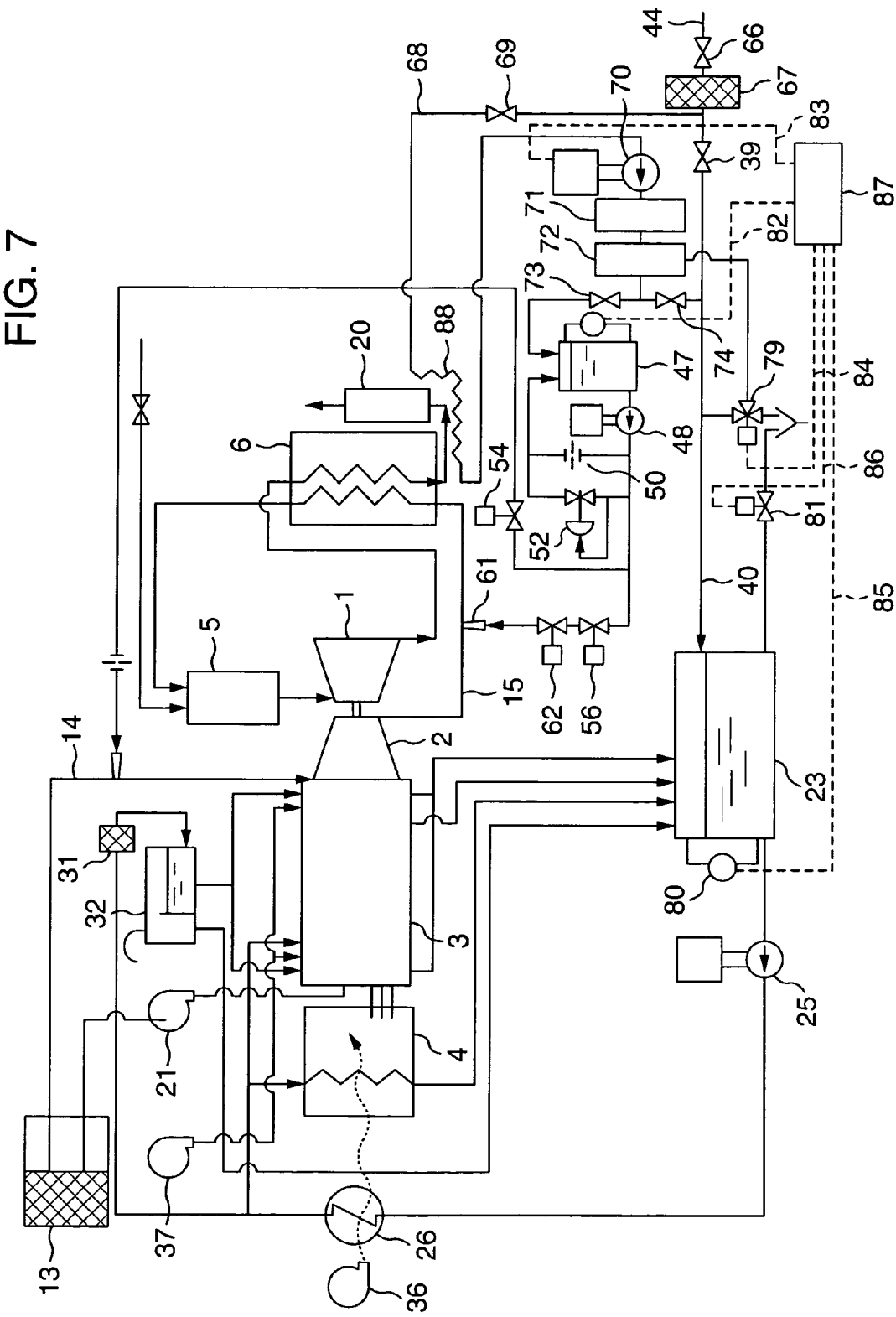
FIG. 7 is a block diagram illustrating a gas turbine power plant in a sixth embodiment of the present invention.

Referring to FIG. 7 which shows a gas turbine power plant in a sixth embodiment of the present invention, the basic configuration of the sixth embodiment is the same as that of the fifth embodiment shown in FIG. 6, except the provision of such a configuration that a bypass pipe line 68 branches from the water supply pipe line 44, downstream of the filter 67 so as to subject the water therefrom to heat-exchange by the regenerative heat-exchanger 6 and a muffler device 20, and a heat-exchange part 88 serving as the temperature raising means is provided in a part opposed to the regenerative heat-exchanger 6 and the muffler device 20.

In the configuration of this embodiment, water led from the filter 67 to the water feed pump 70 is heated up to a high temperature by the heat-exchange part 8 receiving heat from the regenerative heat-exchanger 6 and the muffler device 20. The heated water is fed into the severs osmotic membrane filter 72 by the water feed pump 70. The quantity of water transmitted through the reverse osmotic membrane filter 72 depends remarkably upon a temperature of the water, that is, should the temperature of the water be lowered, it would be remarkably decreased. However, in this embodiment, the water having a raised temperature is fed into the reverse osmotic membrane filter 72, and accordingly, the quantity of the transmitted water can be increased. As a result, it is possible to reduce the power for driving the accessories including the water feed pump 72 can be reduced. Further, should the Porous membrane in reverse osmotic membrane filter 72 be frozen, it would lose its water transmission function. Thus, the thermal insulation would be required therefor in the winter season. However, the present invention is free from this disadvantage, that is, the gas turbine power plant can be installed in any territory or any place. Further, the heat-exchange part 88 of the pipe line 68 can shield the accessories such as the pumps, the blowers and the solenoid valves against heat from the regenerative heat-exchanger 6 and the muffler device 20, thereby it is possible to prolong the service lives of the accessories, and ensure the reliability thereof.

It is noted that in the embodiment shown in FIG. 7, although the heat-exchange part 88 of the pipe line 68 is located in the vicinity of the regenerative heat-exchanger 6 and the muffler device 20, the heat-exchange part 88 may be located near the gas turbine 1 or the combustor 5 in a zone where water having a high temperature does not evaporate within the pipe line 68 since it is important to cause the water having a high temperature to transmit through the reverse osmotic membrane filter 72. Further, within the gas turbine power plant, the heat-exchange part 88 can be located in a place where heat shield may be made in order to protect the above-mentioned accessories against heat from the gas turbine 1, the combustor 5, the regenerative heat-exchanger 6 and the exhaust gas passage downstream of them.

As stated above, this configuration of this embodiment exhibits technical effects and advantages the same as that exhibited by the configuration of the fifth embodiment, and further, the quantity of water transmitting through the reverse osmotic membrane filter 72 can be increased while the power for accessories including the water feed pump 70 can be reduced. Further, the gas turbine power plant can be installed in any place or any restrict. Further, accessories such as pumps, blowers and solenoid valves provided around the gas turbine power plant can be shielded from heat, thereby it is possible to prolong the use lives of the accessories, and to ensure the reliability.

Figure 8:
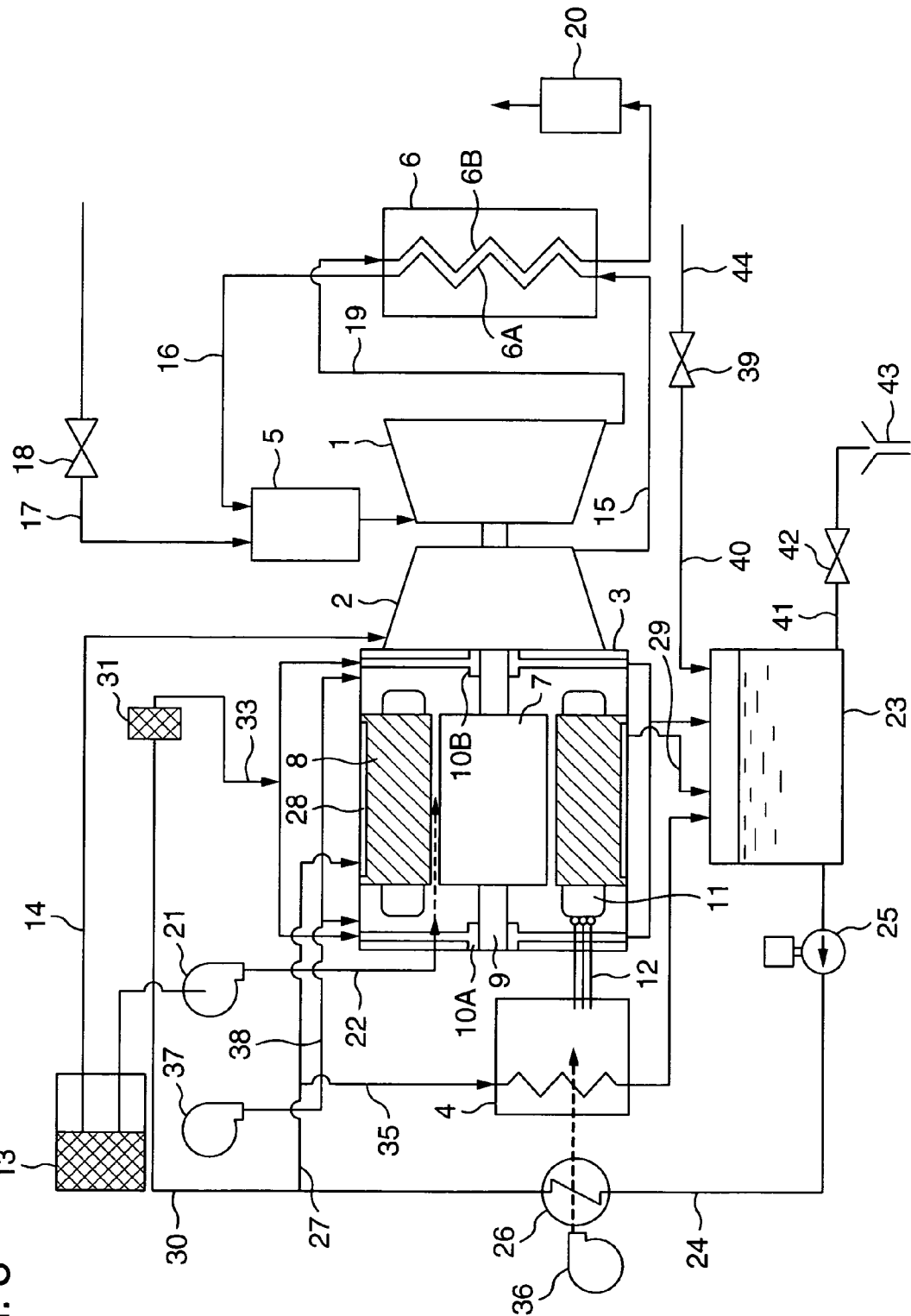
FIG. 8 is a block diagram illustrating a gas turbine power plant in a seventh embodiment of the present invention.

FIG. 8 is a gas turbine power plant in a seventh embodiment of the present invention. In such a case that the supply of the lubrication water into the water lubrication bearings 10A, 10B is insufficient due to increased weight of rotary parts of the gas turbine 1, the compressor 2 and the generator 3, the lubrication water having passed through the filter 31 may be directly fed into the water lubrication bearings 10A, 10B by way of the pipe line 33 without being reserved in the lubrication water tank 32. Further, in order to prevent unstable oscillation of the water lubrication bearings 10A, 10B during high speed operation, there may be used squeeze damper type bearings in which water is fed into a slight gap defined between a bearing support part and a bearing housing so as to enhance damping effect in order to enhance the damping of the bearings. In this case, by directly supplying water from the water circulation pump 25 into the gap serving as a squeeze damper without by way of the lubrication water tank 32, high pressure lubrication water can be fed into the bearing part.

Figure 9:
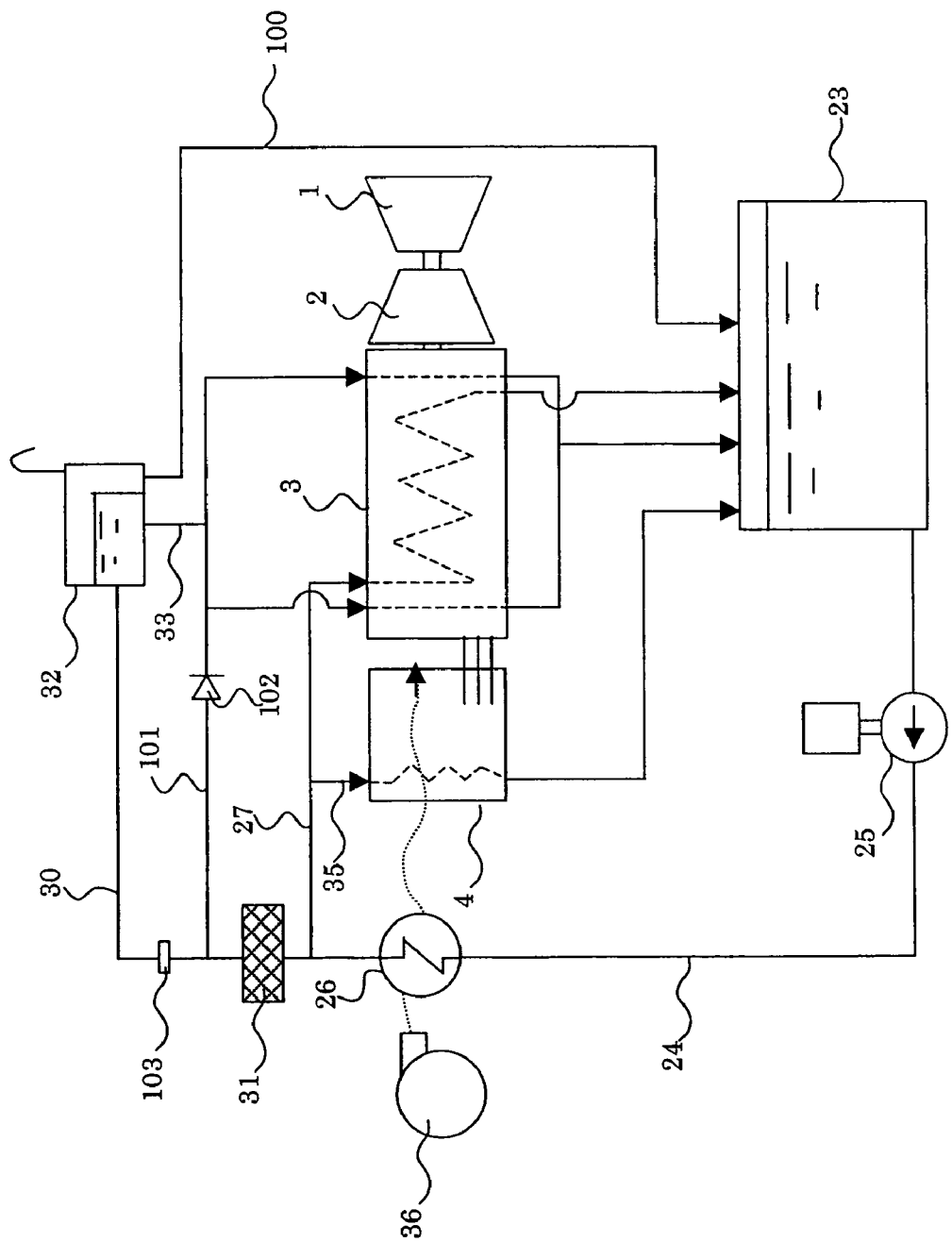
FIG. 9 is a block diagram illustrating a gas turbine power plant in an eight embodiment of the present invention.

FIG. 9 shows a gas turbine power plant in an eighth embodiment of the present invention, it is noted that only a water circulating system and a water lubrication system are shown in FIG. 9, that is, a suction part and an exhaust part of a turbine system is not shown.

If the circular pump 25 causes any failure, the gas turbine system automatically comes to a stop. At this time, in order to stop the operation of a turbine with no critical damage to a rotary machine, lubrication water should be always fed even during a rest of the turbine. In the embodiment shown in FIG. 8, although high pressure lubrication water can be fed into the bearing part, should the supply of the lubrication water be interrupted due to a failure of the water circulation pump 25 or the like, the lubrication water could not be fed into the rotary shaft, thus possibly causing damages such as seizure to the bearings.

Thus, in the embodiment shown in FIG. 9, in addition to the configuration shown in FIG. 8, the circulation water tank 32 is located at a position higher than the rotary shaft 9 as viewed in the gravitational direction in order to provide a means for preventing the bearing from being damaged upon a failure of the water circulation pump 25. Further, the lubrication water is fed into the bearing part of the generator with the use of the means for feeding the lubrication water from the circulation water tank 32 under potential energy and the means for feeding the lubrication water through the pressurization by the circulation water pump 25.

Explanation will be hereinbelow made of the configuration shown in FIG. 9, a part of water fed under pressure from the water circulation pump 25 is used as cooling water so as to cool the power converter 4 and the generator 3 by way of the pipe line 27, and the remainder thereof is used as lubrication water by way of the filter 31. The lubrication water having passed through the filter 31 is then divided into the one which is fed into the bearing part in a pressurized condition by way of a pipe line 101 and a check-valve 102, and the other one which branches downstream of the filter 31 and which is led into the lubrication water tank 32 located at a position higher than the rotary shaft (which is not shown in FIG. 9 but which is shown in FIG. 1) by way of the pipe line 30. The supply quantity of the lubrication water into the lubrication water tank 32 is regulated by a lubrication water regulator 103 connected in the pipe line 30 and composed of an orifice and the like. The height of the lubrication water tank 32 measured from the rotary shaft of the generator is set so as to obtain a head difference which can ensure a minimum supply pressure required for preventing the bearings from being damaged upon a failure of the water circulation pump 25, and the volume of the lubrication water tank 32 has a capacity for maintaining the supply of water into the bearing part alone until the rotary shaft comes to a stop upon emergency. With this configuration, the lubrication water tank 32 can be small-sized in comparison with the lubrication water tank shown in FIG. 1.

In the configuration shown in FIG. 9, during normal operation, the lubrication water is fed into the bearing part from both pipe line 101 through which the lubrication water is fed being pressurized by the water circulation pump 25, and pipe line 33 through which the lubrication water is fed from the lubrication water tank 32 under potential energy. In this configuration, when the water circulation pump 22 fails, although the supply of the lubrication water through the pipe line 101 is stopped, the lubrication water reserved in the lubrication water tank 32 is fed into the bearing part until the rotary shaft comes to a stop. It is noted that since the check valve 102 is connected in the pipe line 101, the water fed from the lubrication water tank 32 can be prevented from counterflowing toward the water circulation pump, thereby it is possible to surely feed the water into the bearing part.

Figure 10:
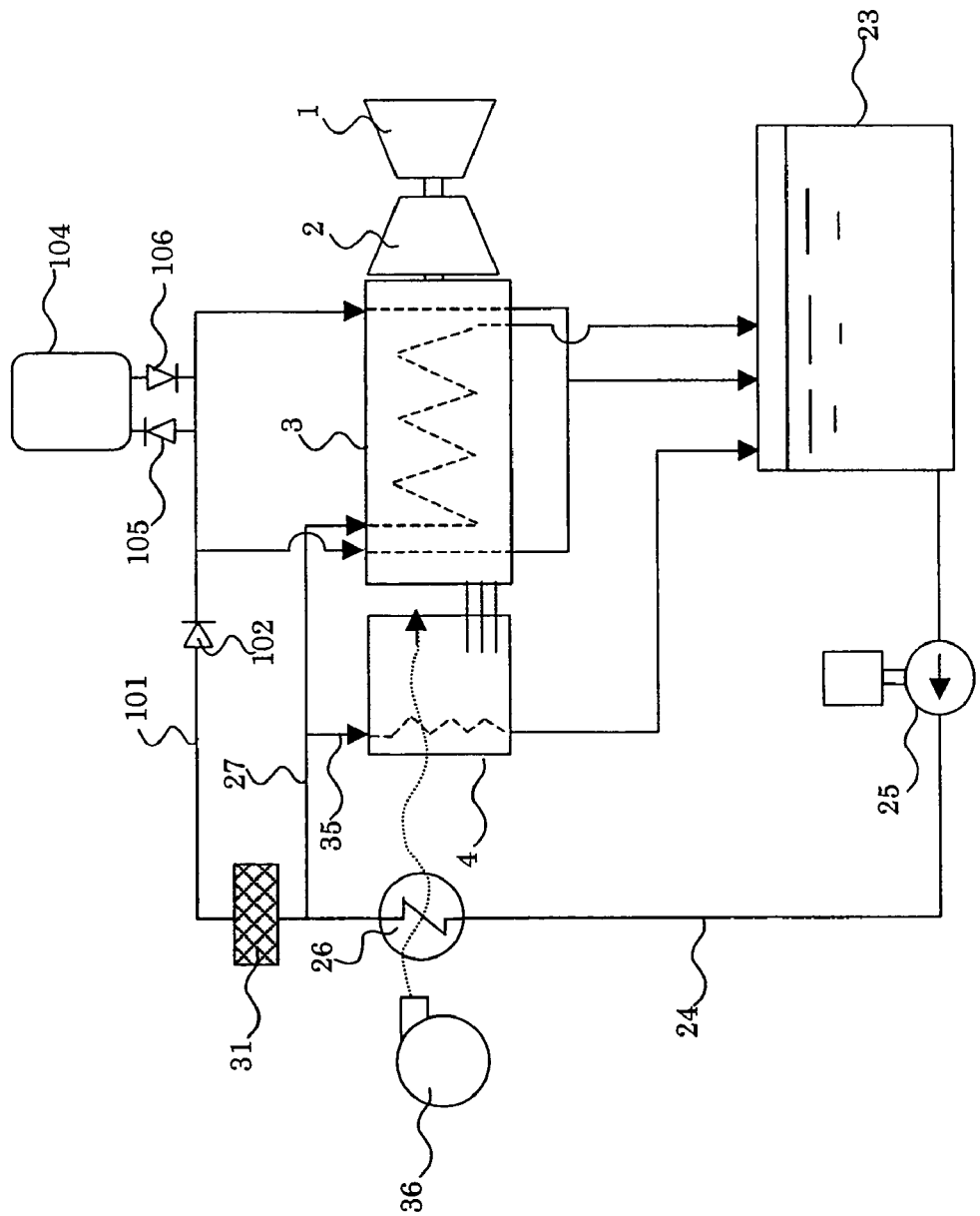
FIG. 10 is a block diagram illustrating a gas turbine power plant in a ninth embodiment of the present invention.

Referring to FIG. 10 which shows a configuration of a gas turbine power plant in a ninth embodiment of the present invention, also in this embodiment, similar to the configuration shown in FIG. 9, the lubrication water can be fed even upon a failure of the water circulation pump. In this embodiment, an accumulator 104 is connected to the lubrication water supply pipe line 101. This accumulator 104 is incorporated thereto with an accumulator inlet side check valve 105 and an accumulator outlet side check valve 106. When the water fed through the pipe line 101 by adjusting the internal pressure of the accumulator and the cracking pressure of the check valves 105, 106, the water is reserved in the accumulator 101. When the pressure in the pipe line 101 is lowered, the water reserved in the accumulator is automatically discharged into the pipe line 101. The accumulator can have a capacity with which the water can be fed into the bearing part by a required quantity until the rotary shaft comes to a stop.

Figure 11:
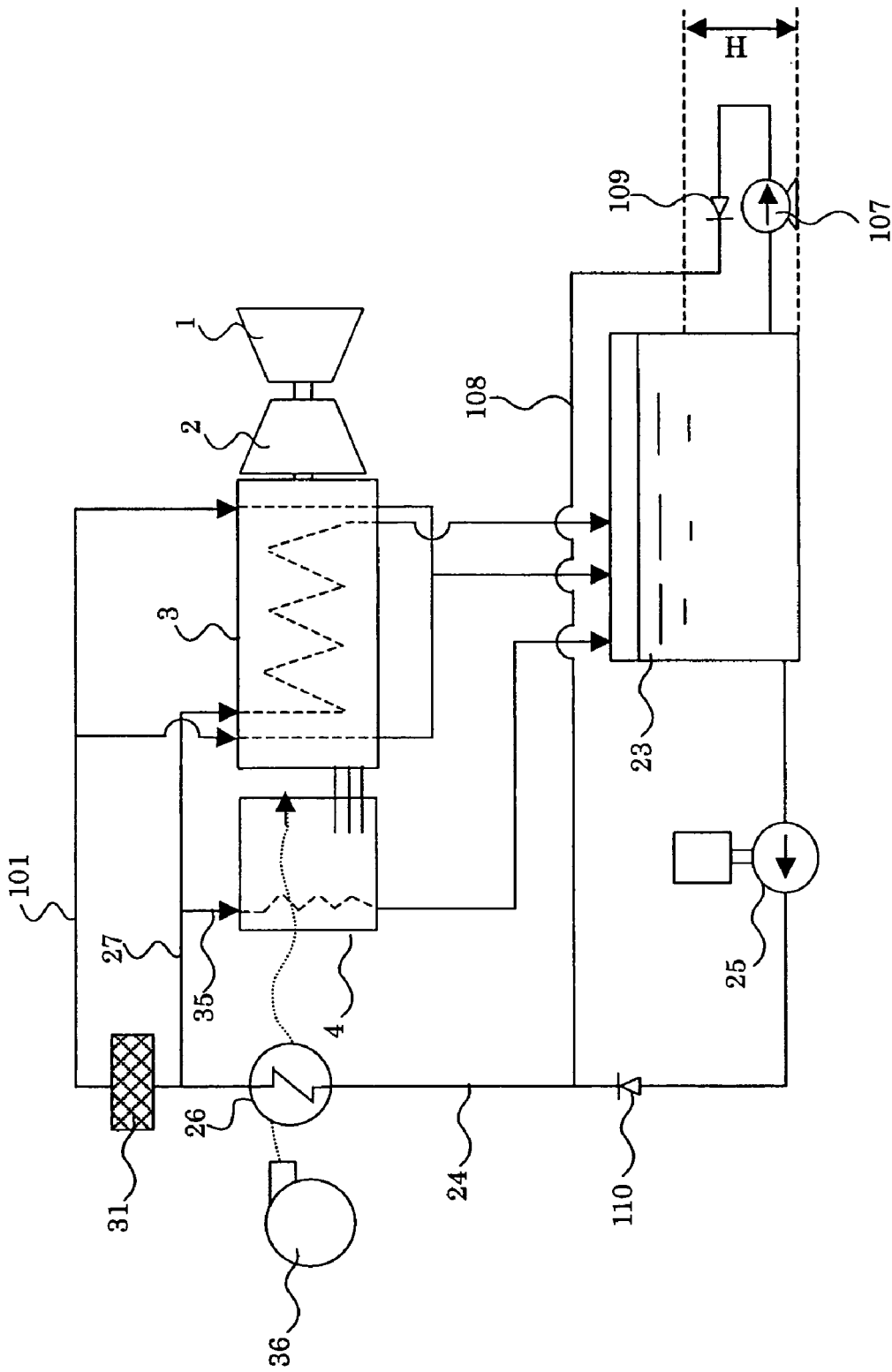
FIG. 11 is a block diagram illustrating a gas turbine power plant in a tenth embodiment of the present invention.

Referring to FIG. 11 which shows a configuration of a gas turbine power plant, in a tenth embodiment of the present invention, this configuration incorporates an emergency water circulation pump 107. A pipe line 105 for the emergency water circulation pump 107 is connected to the discharge side pipe line 24 for the water circulation pump 25, downstream of a check valve 110 connected in the pipe line 24 by way of a check valve 109. In this configuration, the emergency pump 107 and the check valve 109 are provided at a height which not greater than the water level in the circulation water tank 23 which is held during operation of the water circulation pump 25. In FIG. 11, the water reaches downstream of the check valve 109 during normal operation of the pump. Further, the pipe line up to the emergency pump 107 and the check valve 106 is located lower than the water level in the circulation water tank, and accordingly, the water is filled therein. In the configuration shown in FIG. 11, upon a failure of the circulation pump, the emergency pump 107 is operated so as to feed the circulation water into the pipe line 24. Since the pipe line 108 for the emergency pump 107 is always filled with the water, no air is mingled into the pipe line during change-over of the pumps.

Figure 12:
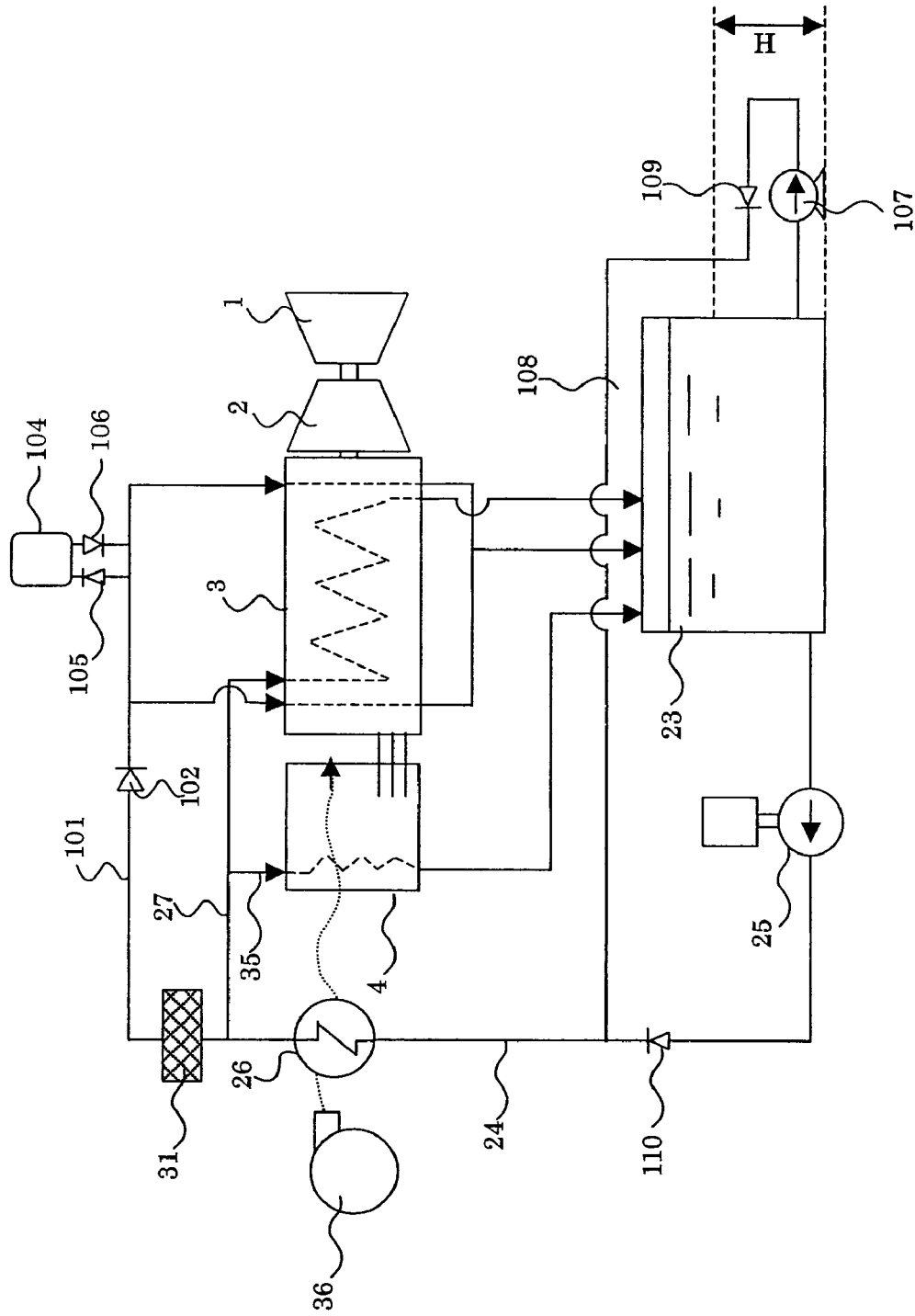
FIG. 12 is a block diagram illustrating a gas turbine power plant in an eleventh embodiment of the present invention.

Referring to FIG. 12 which shows a configuration of a gas turbine power plant in an eleventh embodiment of the present invention, this configuration incorporates an accumulator 104 in the pipe line 101, in addition to the configuration shown in FIG. 11. The water is fed also from the accumulator 104 during operation of the emergency pump 107 so as to prevent the supply of water into the bearing part from being stopped.

Figure 13:
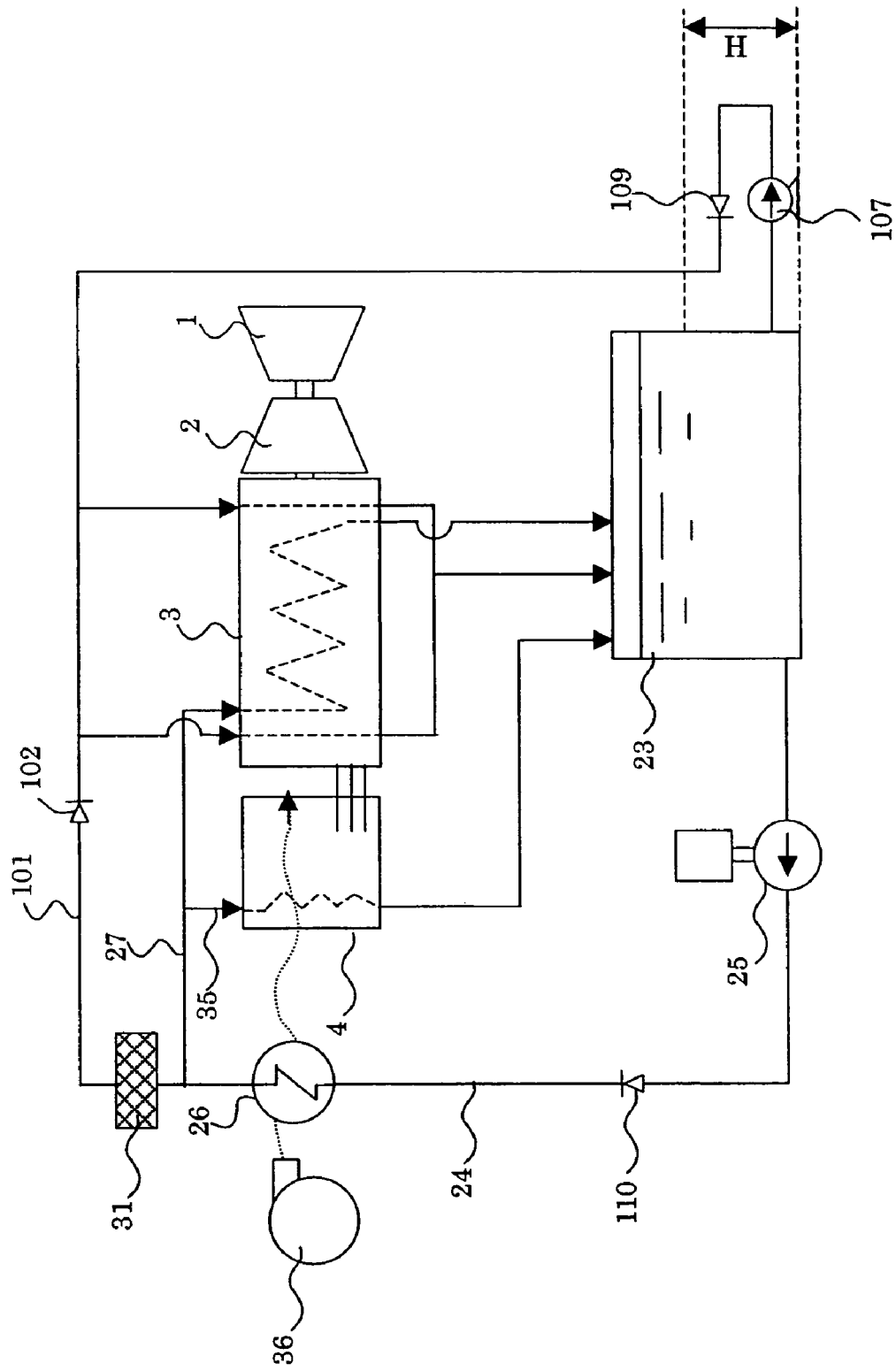
FIG. 13 is a block diagram illustrating a gas turbine power plant in a twelfth embodiment of the present invention.

Referring to FIG. 13 which shows a configuration of a gas turbine power plant in a twelfth embodiment of the present invention, this configuration is the same as that of the embodiment shown in FIG. 11, except that an emergency pump 107 is small-sized so that the water can feed a minimum quantity of the water required until the rotary shaft comes to a stop upon a failure of the circulation water pump. An accumulator similar to that of the configuration shown in FIG. 12 may be also incorporated in this configuration shown in FIG. 13.

With the configurations stated above, according to the present invention, it is possible to provide a gas turbine power plant having an enhanced efficiency of power generation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A gas turbine power plant comprising a compressor for compressing air, a combustor for mixing the compressed air with fuel so as to burn the fuel, a gas turbine adapted to be driven by combustion gas produced from the combustor, a generator having, in a generator housing, a stator winding and a rotor driven by the gas turbine and journalled by bearings, and a cooling water circulating means for cooling the generator, wherein water lubrication bearings are arranged in the generator housing, and are used as the bearings in the generator, and cooling water is fed into the water lubrication bearings from the cooling water circulating means by way of a heat radiator, and a blower is provided for feeding outside air as sealing air between end faces of the stator winding and the water lubrication bearings in the generator housing so as to allow the sealing air to define a seal surface against water scattering from the water lubrication bearings.

2. A gas turbine power plant comprising a compressor for compressing air, a combustor for mixing the compressed air with fuel so as to burn the fuel, a gas turbine adapted to be driven by combustion gas produced from the combustor, a generator having, in a generator housing, a stator winding and a rotor driven by the gas turbine and journalled by bearings, and a cooling water circulating means for circulating cooling water through the generator so as to cool the generator, wherein water lubrication bearings are arranged in the generator housing and are used as the bearings in the generator, and a lubrication water supply means is provided for feeding the cooling water from the cooling water circulating means into the water lubrication bearings by way of a heat radiator, and a blower is provided for feeding outside air as sealing air between end faces of the stator winding and the water lubrication bearings in the generator housing so as to allow the sealing air to define a seal surface against water scattering from the water lubrication bearings.

3. A gas turbine power plant comprising a compressor for compressing air, a combustor for mixing the compressed air with fuel so as to burn the fuel, a gas turbine driven by combustion gas produced from the combustor, a regenerative heat-exchanger for exchanging heat between exhaust gas from the gas turbine and the compressed air fed into the combustor, a generator driven by the gas turbine having, in a generator housing, a stator winding and a rotor, water lubrication bearings arranged in the generator housing, for journalling the rotor in the generator, a power converter converting an output power from the generator, into an output power having a frequency corresponding to a commercial frequency, a cooling water circulating means for feeding cooling water from a cooling water tank into the generator by way of a heat radiator, and then returning the cooling water into the cooling water tank, a lubrication water supply means for feeding the cooling water fed from the cooling water circulating means by way of the heat radiator into the water lubrication bearings, and blower for feeding outside air as sealing air between end faces of the stator winding and the water lubrication bearings in the generator housing so as to allow the sealing air to define a seal surface against water scattering from the water lubrication bearings.

4. A gas turbine power plant as set forth in claim 1, wherein a spray water supply means for feeding spray water into the suction side and the discharge side of the compressor.

5. A gas turbine power plant as set forth in claim 4, wherein an impurity removal means for removing impurities from the water fed into the spray water supply means.

6. A gas turbine power plant as set forth in claim 5, wherein a change-over valve for feeding drain water from the impurity removal means into the cooling water circulating means.

7. A gas turbine power plant as set forth in claim 6, wherein the impurity removal means comprises a reverse osmotic membrane filter.

8. A gas turbine power plant as set forth in claim 7, wherein a temperature increasing means for increasing a temperature of water fed into the impurity removal means.

9. A gas turbine power plant comprising a compressor having a suction side and a discharge side, for compressing air, a combustor for mixing the compressed air with fuel so as to burn the fuel, a gas turbine adapted to be driven by combustion gas produced from the combustor, a generator having, in a generator housing, a stator winding and a rotor driven by the gas turbine and journalled by bearings, and a cooling water circulating means for cooling the generator, wherein the cooling water circulating means comprises a spray water supply means including a cooling water tank, a water circulation pump for feeding water from the cooling water tank into a cooling jacket formed in the generator, by way of a heat radiator, a lubrication water supply means for feeding cooling water fed from the cooling water circulating means by way of the heat radiator, into water lubrication bearings arranged in the generator housing and serving as the bearings in the generator, a blower for feeding outside air as sealing air between end faces of the stator winding and the water lubrication bearings in the generator housing, so as to allow the sealing air to define a seal surface against water scattering from the water lubrication bearings, and a spray water supply means incorporating a spray water tank for reserving water branching from the water fed into the cooling water tank, a spray water feed pump for feeding water from the spray water tank, a pipe line for returning water fed from the spray water feed pump, into the spray water tank by way of an orifice, a back pressure regulating valve provided downstream of the spray water feed pump, for setting a pressure of water therein, a pipe line for returning water into the spray water tank by way of the back pressure regulating valve, and a pipe line for feeding water by way of valves, and spray water nozzles, which are located downstream of the back pressure regulating valve, so as to inject spray water into the suction side and the discharge side of the compressor.

10. A gas turbine power plant comprising a compressor having a suction side and a discharge side, for compressing air, a combustor for mixing the compressed air with fuel so as to burn the fuel, a gas turbine adapted to be driven by combustion gas produced from the combustor, a generator having, in a generator housing, a stator winding and a rotor driven by the gas turbine and journalled by bearings, and a cooling water circulating means for cooling the generator, wherein the cooling water circulating means comprises a spray water supply means including a cooling water tank, a water circulation pump for feeding water from the cooling water tank to a cooling jacket formed in the generator by way of a heat radiator, a lubrication water supply means for feeding cooling water fed from the cooling water circulating means by way of the heat radiator, into water lubrication bearings arranged in the generator housing and serving as the bearings in the generator, a blower for feeding outside air as sealing air between end faces of the stator winding and the water lubrication bearings in the generator housing so as to allow the sealing air to define a seal surface against water scattering from the water lubrication bearings, and, a spray water supply means including a water feed pump for feeding water branching from the water fed into the cooling water tank, a spray water tank for reserving water from the water feed pump, a spray water feed pump for feeding water from the spray water tank, a pipe line for returning water fed from the spray water feed pump, into the spray water tank by way of an orifice, a back pressure regulating valve provided downstream of the spray water feed pump, for setting a pressure of water therein, a pipe line for returning water into the spray water tank by way of the back pressure regulating means, and a pipe line for feeding water by way of valves, orifices and injection nozzles, which are located downstream of the back pressure regulating valve, so as to inject spray water into the suction side and the discharge side of the compressor, and a chlorine removal filter and a reverse osmotic membrane filter which are communicated with the spray water tank is provided downstream of the water feed pump.

11. A gas turbine power plant as set forth in claim 9, wherein a control device for controlling a change-over valve for changing over drain water from a reverse osmotic membrane filter between a drain port side and the cooling water tank side, a solenoid valve provided in a drain pipe line provided to the cooling water tank, and a water feed pump in response to signals from level gages for detecting water levels in the cooling water tank and the spray water tank.

12. A gas turbine power plant comprising a compressor for compressing air, a combustor for mixing the compressed air with fuel so as to burn the fuel, a gas turbine adapted to be driven by combustion gas produced from the combustor, and a generator having, in a generator housing, a stator winding and a rotor driven by the gas turbine and journalled by bearings, wherein water lubrication bearings arranged in the generator housing and used as the bearings for journalling the rotor of the generator and arranged in the generator housing, a cooling water circulating means for feeding cooling water by means of a water circulation pump from the cooling water tank into the generator by way of a heat radiator and returning the water into the cooling water tank, a lubrication water supply means for feeding a part of the cooling water fed through the heat radiator of the cooling water circulating means, into the water lubrication bearings by means of the water circulating pump and feeding the remainder of the cooling water into a lubrication water tank located higher than the water lubrication bearings so as to feed water from the lubrication water tank into the water lubrication bearings under a potential energy, and a blower for feeding outside air as sealing air between end faces of the stator winding and the lubrication water bearings in the generator housing so as to allow the sealing air to define a seal surface against water scattering from the water lubrication bearings.

13. A gas turbine power plant comprising a compressor for compressing air, a combustor for mixing the compressed air with fuel so as to burn the fuel, a gas turbine adapted to be driven by combustion gas produced from the combustor, and a generator having, in a generator housing, a stator winding and a rotor driven by the gas turbine and journalled by bearings, wherein water lubrication bearings arranged in the generator housing and used as the bearings for journalling the rotor of the generator, a cooling water circulating means for feeding cooling water by means of a water circulation pump from a cooling water tank into the generator by way of a heat radiator and returning the water into the cooling water tank, and a lubrication water supply means for feeding water fed from the cooling water circulating means, through the intermediary of the heat radiator, into the water lubrication bearings by way of an accumulator, and a blower for feeding outside air as sealing air between end faces of the stator winding and the lubrication water bearings in the generator housing so as to allow the sealing air to define a seal surface against water scattering from the water lubrication bearings.

14. A gas turbine power plant as set forth in claim 12, wherein an emergency cooling water circulating means for feeding the cooling water from the cooling tank into the generator or the water lubrication bearings upon a failure of the water circulation pump.

15. A gas turbine power plant as set forth in claim 14, wherein the emergency cooling water supply means feeds the cooling water from the cooling water tank into a system upstream of the heat radiator.

16. A method of operating a gas turbine power plant comprising a compressor for compressing air, a combustor for mixing the compressed air with fuel so as to burn the fuel, a gas turbine driven by combustion gas produced from the combustor, a generator having, in a generator housing, a stator winding and a rotor driven by the gas turbine and journalled by water lubrication bearings, a cooling water circulating means for cooling the generator so that cooling water from a cooling water tank is fed by a water circulation pump into the generator by way of a heat radiator, and is then returned into the cooling water tank, and a lubrication water supply means for feeding a part of the cooling water fed from the cooling water circulating means by way of the heat radiator, into the water lubrication bearings through the water supply of the water circulation pump, and for feeding the remainder of the cooling water into a lubrication water tank located at a level higher than the water lubrication bearings in order to feed water into the water lubrication bearings from the lubrication water tank with the use of a potential energy, wherein the lubrication water is fed from both or one of the water circulation pump and the lubrication water tank during normal operation, but the lubrication water is fed from the lubrication water tank when the water circulation pump comes to a stop upon a failure thereof, and a blower is provided for feeding sealing air between end faces of the stator winding and the water lubrication bearings in the generator housing.

17. A gas turbine power plant comprising a compressor for compressing air, a combustor for mixing compressed air with fuel so as to burn the fuel, a gas turbine driven by combustion gas produced from the combustor, a generator having, in a generator housing, a stator winding and a rotor driven by the gas turbine and journalled by bearings, and a cooling water circulating means for cooling the generator, wherein water lubrication bearings are arranged in the generator housing and used as the bearings in the generator, cooling water from the cooling water circulating means is fed into the water lubrication bearings, and a blower for feeding outside air as sealing air between end faces of the stator winding and the water lubrication bearings so as to allow the sealing air to define a seal surface against water scattering from the water lubrication bearings.

* * * * *